US005668719A

United States Patent [19]
Bobrov et al.

[11] Patent Number: 5,668,719
[45] Date of Patent: Sep. 16, 1997

[54] METHOD OF FERTILIZER APPLICATION AND FIELD TREATMENT

[75] Inventors: Vladimer A. Bobrov, Minsk, Belarus; Nickolay A. Kan, Novocherkassk, Russian Federation; Tamara G. Yanchevskaya, Minsk, Belarus; Donald E. McGrath, Benson, Minn.; Andrey V. Skotnikov, Minsk, Belarus

[73] Assignee: Tyler Limited Partnership, Benson, Minn.

[21] Appl. No.: 413,859

[22] Filed: Mar. 28, 1995

Related U.S. Application Data

[63] Continuation-in-part of Ser. No. 286,476, Aug. 5, 1994, abandoned.

[51] Int. Cl.$^6$ .................................................... G06F 17/60
[52] U.S. Cl. ........................................................... 364/420
[58] Field of Search ................................... 364/420, 401 R

[56] References Cited

U.S. PATENT DOCUMENTS

| | | | |
|---|---|---|---|
| 3,468,379 | 9/1969 | Rushing et al. | 172/2 |
| 4,358,054 | 11/1982 | Ehrat | 239/155 |
| 4,588,127 | 5/1986 | Ehrat | 239/156 |
| 4,630,773 | 12/1986 | Ortlip | 239/1 |
| 4,714,196 | 12/1987 | McEachern et al. | 239/62 |
| 5,033,397 | 7/1991 | Colburn, Jr. | 111/118 |
| 5,050,771 | 9/1991 | Hanson et al. | 222/1 |
| 5,220,876 | 6/1993 | Monson et al. | 111/130 |

OTHER PUBLICATIONS

*Using a Multifactor System to Develop Crop Production Recommendations*, by John L. Strauss, Taralon Corporation, Jul. 27–28, 1976, pp. 73–77.

*Blending System Able to Apply Eight Products Simultaneously*, "Outstanding Innovations for 1993" The Agricultural Engineering 50 1993.

*Primary Examiner*—Donald E. McElheny, Jr.
*Attorney, Agent, or Firm*—Westman, Champlin & Kelly, P.A.

[57] ABSTRACT

The present invention is drawn to a system of treating a field of interest. A plurality of soil samples are taken from different geographic locations in the field of interest. Geographic identifiers are determined for each of the plurality of samples wherein the identifiers identify the geographic location from which the sample was taken. The samples are analyzed to determine a plurality of soil characteristics indicative of soil condition. A plurality of data bases are accessed to obtain field characteristics corresponding to the field of interest, the field characteristics being indicative of current and historical information corresponding to the field of interest. A program for applying material to the field of interest is determined based on the soil characteristics, the geographic identifiers, and the field characteristics. The program is loaded into a controller operably coupled to an applicator. The applicator is controlled according to the program to apply material to the field of interest.

20 Claims, 23 Drawing Sheets

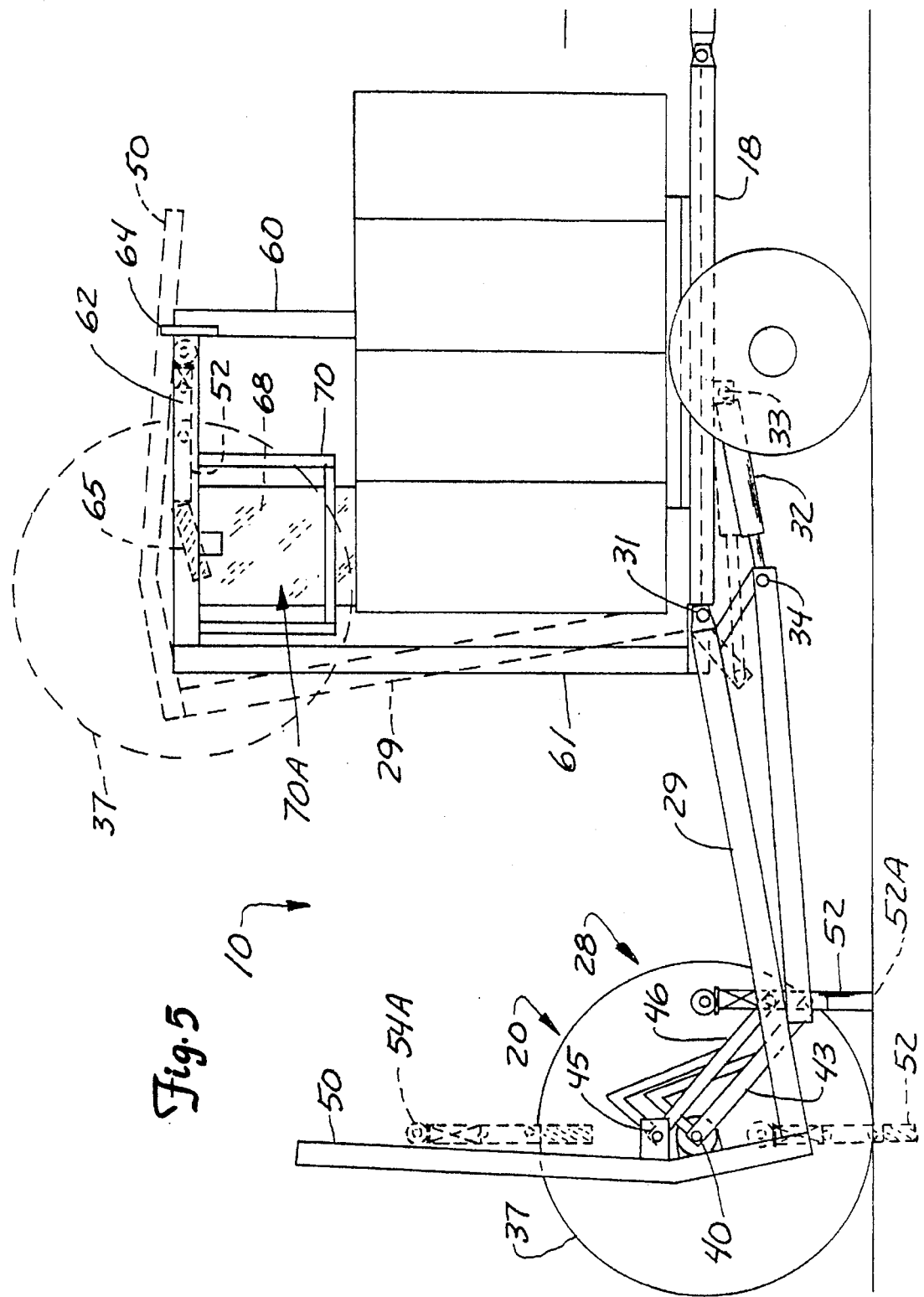

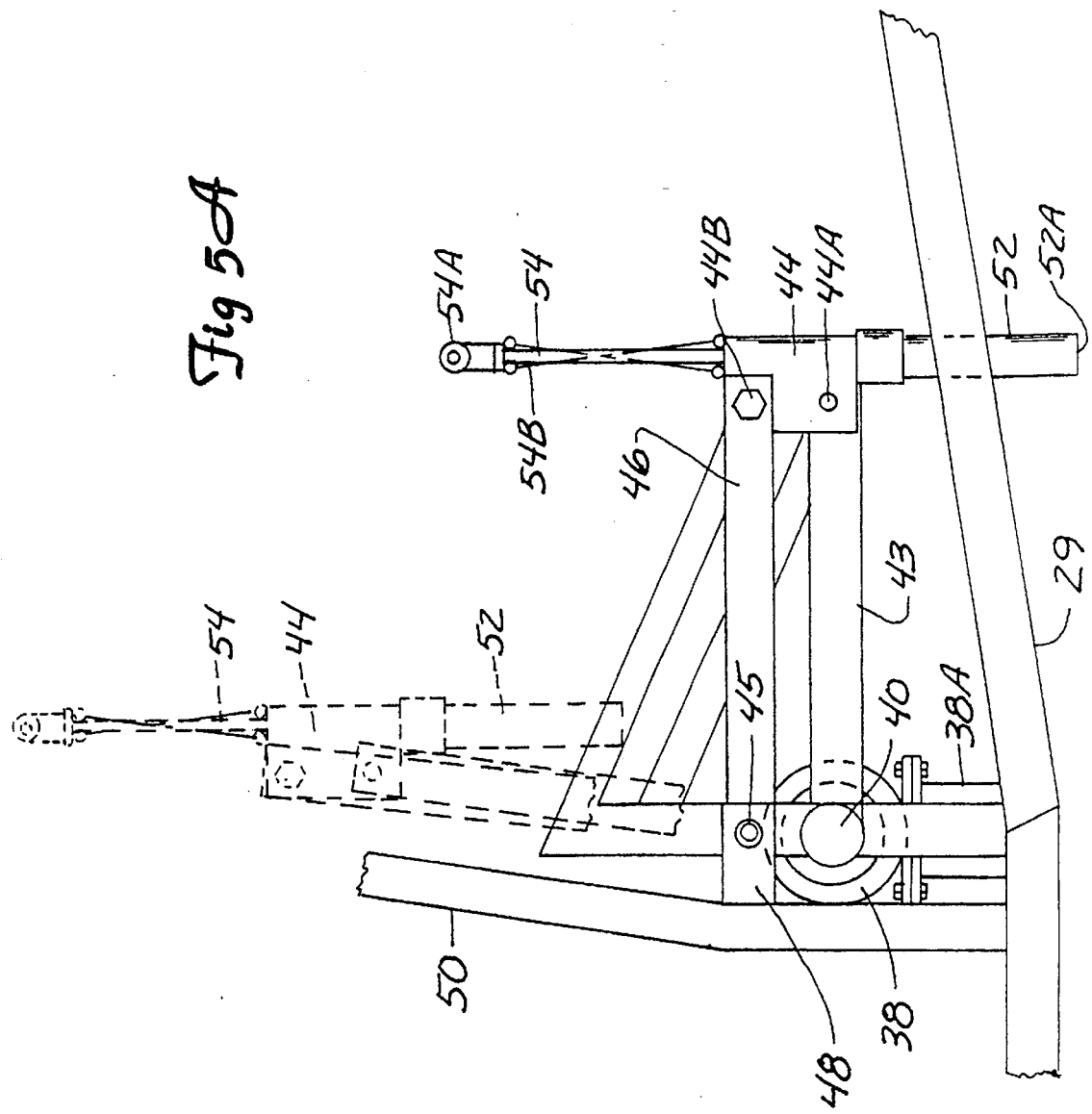

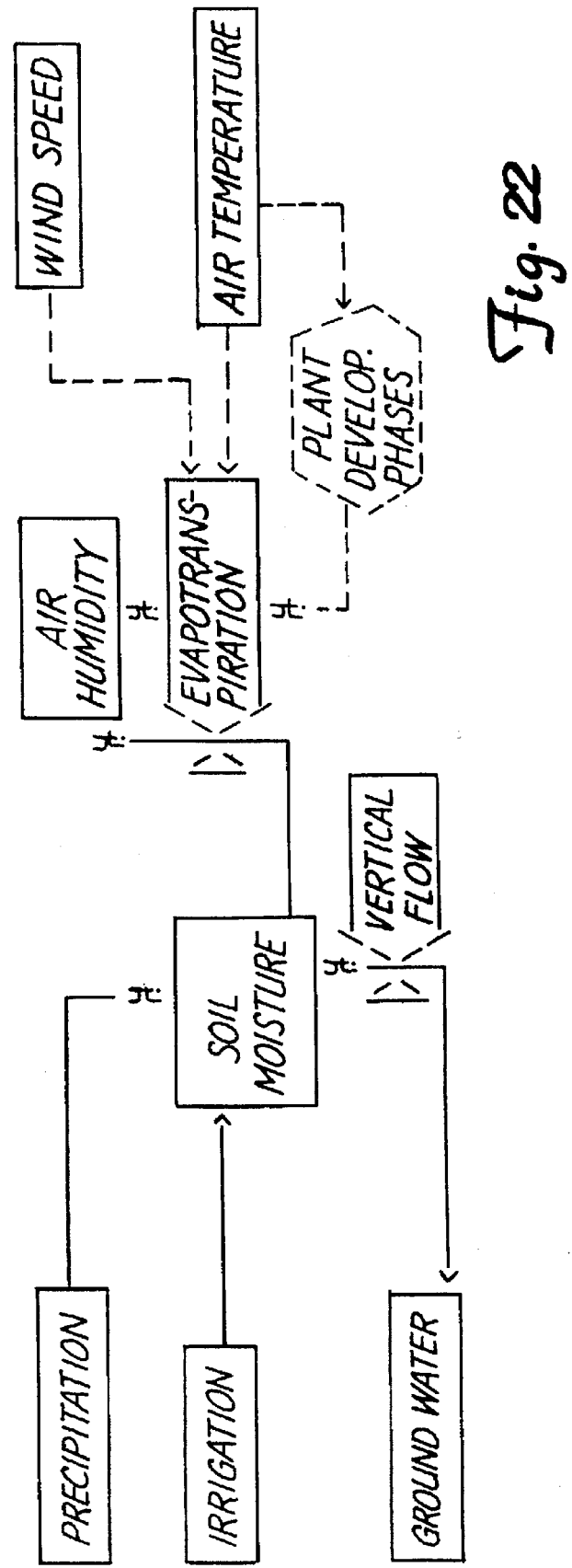

METHOD OF FERTILIZER APPLICATION AND FIELD TREATMENT

REFERENCE TO CO-PENDING APPLICATION

This is a continuation-In-Part application of U.S. patent application Ser. No. 08/286,476 filed Aug. 5, 1994, now abandoned, entitled METHOD OF FERTILIZER APPLICATION and assigned to the same assignee as the present application.

The following are also co-pending applications which are hereby incorporated by reference:

Ser. No. 08/286,768 filed Aug. 5, 1994 entitled AUTOMATED WORK STATION FOR ANALYZING SOIL SAMPLES and assigned to the same assignee as the present invention; and Ser. No. 08/286,769 filed Aug. 5, 1994 entitled SOIL SAMPLER FOR ANALYSIS FOR FERTILIZER DETERMINATION and assigned to the same assignee as the present invention.

BACKGROUND OF THE INVENTION

The present invention is directed to a system for treating a field of interest. More particularly, the present invention is directed to providing a decision support system for agricultural management to enable more accurate treatment of the field of interest.

Each field for growing crops is known to contain several soil types, which may be classified according to relative content of sand, clay and humus. There are several common soil types requiring different specific fertilizer for optimum production. Usually, each field contains various soil types placing different requirements in the different areas.

The most common practice is to fertilize the whole field according to the demand of the poorest soils, or according to the demand of average soils, leading to the fact that many field areas receive more or less fertilizer than optimum. This leads to a loss of excess fertilizer and potential lowering crop yield in the whole area compared to optimum yield levels.

There is a need for economical methods and apparatus to apply fertilizers according to the demand of specific areas in a field.

The prior art discloses methods for fertilizer application based on unification of soil types being determined from IR photography or soil maps and administration of the predetermined rate of fertilizer application for the soil types.

However, even in the determined soil type, for instance, "light loam", the amount of clay and powder-like sand may vary in quite a wide range, not speaking of loam unification. It is also worthy to note the amount of irreversible coupled fertilizer that is inaccessible for plants, will be dependent on the content of salts, clay and powder-like sand and humus in each specific place of the field.

One of the most common practices used in accomplishing agricultural management includes measuring a number of field characteristics and working out some instructions which are provided to an application subsystem to apply material to the field. Typically, these instructions have been based on the long-standing experience of management. One of the main governing principles in forming these instructions is to repeat management procedures which have been used in the past with the best results, under similar conditions.

In recent years, a number of mathematical models have been developed to predict yield outcome for a crop in the field of interest based on quantitative parameters and management procedures. Mathematical expressions enable management to obtain estimated parameter values resulting in the greatest yield, or resulting in minimum cost for an acceptable yield.

However, there are several significant weaknesses of such methods. The first is that the working formulas used in such methods are obtained for an entire field. Therefore, one cannot take into account heterogeneity of soil and crop characteristics within the field. This results in significant differences between predicted and measured yield. Further, the working formulas typically ignore dynamic interaction of the soil, crop, and weather characteristics, during the crop growth period. This also significantly contributes to the overall error of such a method.

Further, while there are current engineering, theoretical and experimental investigations into crop productivity, physical and chemical processes in the soil, and other items related to site specific crop management, and while such techniques make it possible to improve decision making techniques in agricultural management, such a decision making task is still extremely complex and currently requires a great deal of manual calculation and manipulation in order to achieve accuracy. There are virtually no effective systems currently available which take into account soil sample analyses over a wide range of field characteristics, and other things such as historical and future weather and atmospheric characteristics, in determining a valuable program for the application of nutrients, pesticides, irrigation, seeds and other crop management applications.

SUMMARY OF THE INVENTION

The present invention is drawn to a system of treating a field of interest. A plurality of soil samples are taken from different geographic locations in the field of interest. Geographic identifiers are determined for each of the plurality of samples wherein the identifiers identify the geographic location from which the sample was taken. The samples are analyzed to determine a plurality of soil characteristics indicative of soil condition. A plurality of data bases are accessed to obtain field characteristics corresponding to the field of interest, the field characteristics being indicative of current and historical information corresponding to the field of interest. A program for applying material to the field of interest is determined based on the soil characteristics, the geographic identifiers, and the field characteristics. The program is loaded into a controller operably coupled to an applicator. The applicator is controlled according to the program to apply material to the field of interest.

BRIEF DESCRIPTION OF THE DRAWINGS

FIG. 5 is a further detailed side view of the automatic soil sampler;

FIG. 5A is an enlarged side view of a soil sampling probe assembly;

FIG. 22 is a schematic representation of a model used in obtaining soil moisture according to the present invention.

DETAILED DESCRIPTION OF THE PREFERRED EMBODIMENTS

Figure 1:
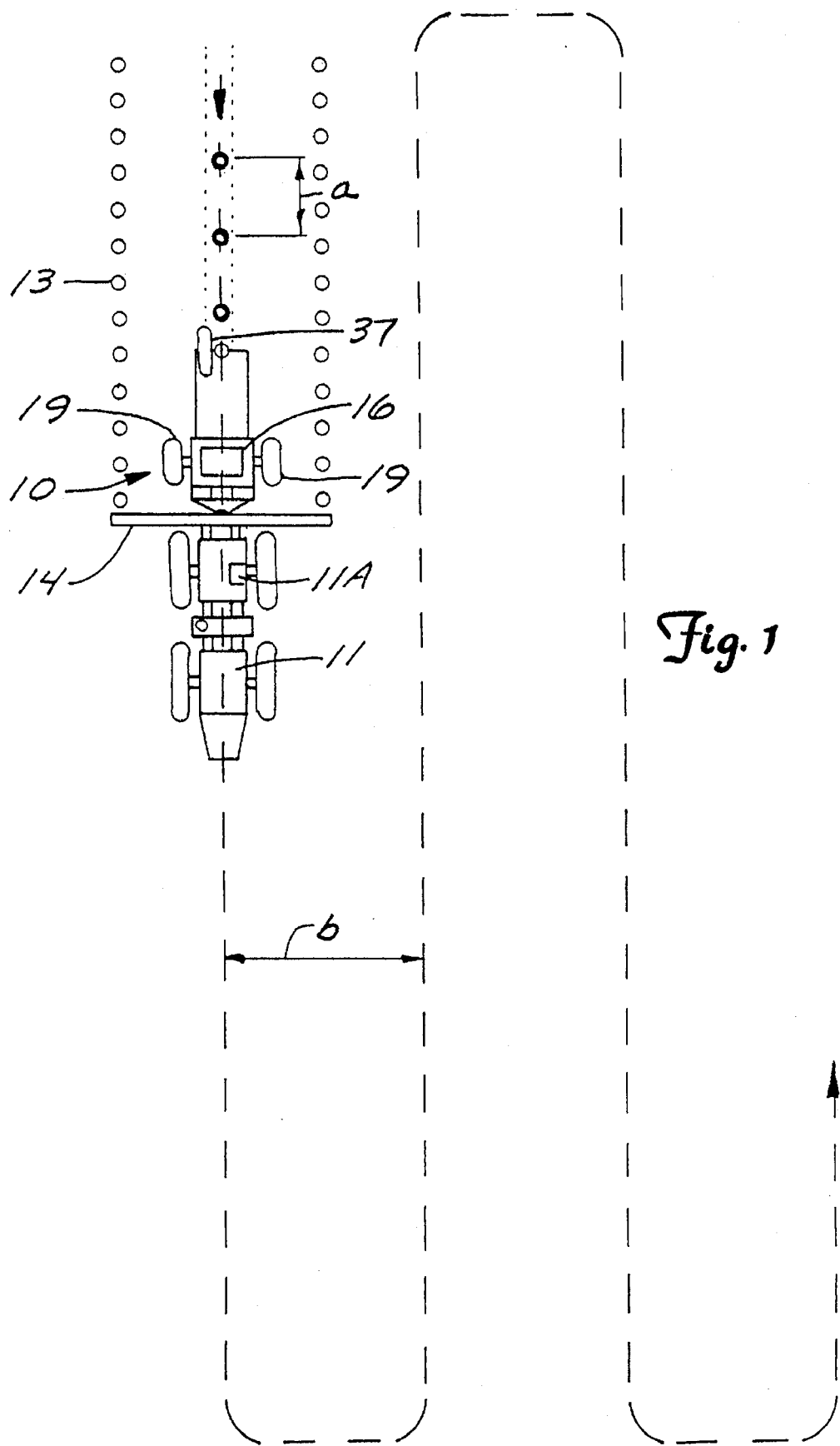
FIG. 1 is a schematic representation of a soil sampling system used to establish a grid pattern.

FIG. 1 schematically illustrates an automatic soil sampler 10 moving over a field 12 in a back and forth motion pattern used by a fertilizer spreader, and providing a series of samples of soil at selected spacing (10–15 meters) along each path to provide samples across a field in a grid. The data on the grid spacing and sampling depth are entered into a memory that also provides an x-y location of each sample taken for identification. The sample depth can be preset by suitable adjustments prior to sampling.

The grid spacing is determined by the parameters "a" and "b" where "a" is distance between adjacent samples, and "b" is the coverage width of a fertilizer spreader again perhaps 10–15 meters.

To determine the grid spacing for the map, a marker with a distance sensor or other navigation means may be used in a known manner. GPS navigation permits accurate x-y coordinates or an odometer 11A (such as a radar odometer) on a towing vehicle 11 can give the "y" distance from a start signal that can be given by an operator at the start of each pass down the field from each end. The "x" distance shown at "b" may be established by foam markers 13 which are correlated to a start position in the field and give the lateral offset of each pass of the sampler.

Figure 2:
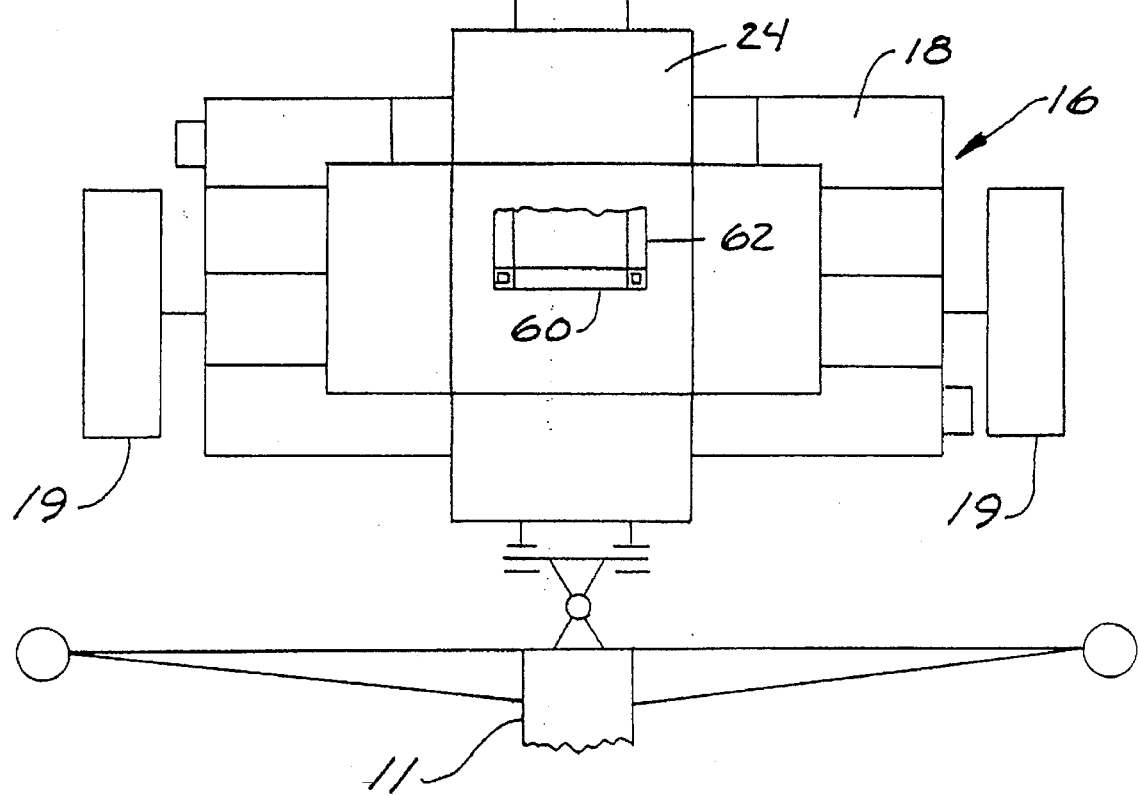
FIG. 2 is a fragmentary schematic top view of an automatic soil sampler.

The soil sampler 10 is a machine designed for automatic on-line soil sampling from the cultivated field. The soil sampler is attached to the vehicle 11 (FIG. 2), which has a boom 14 dropping the foam markers 13, the vehicle has a hydraulic system and electric power supply system.

Figure 3:
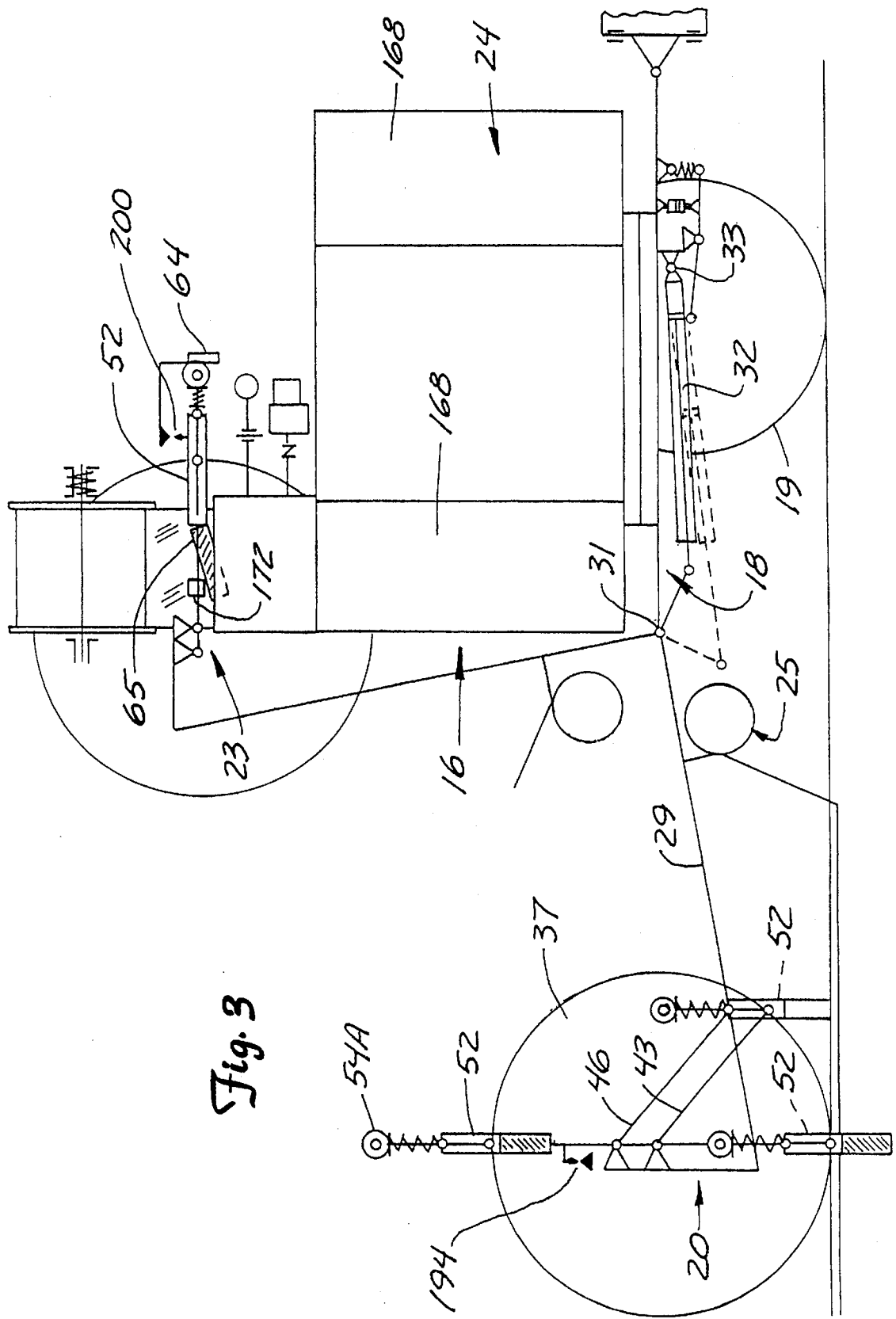
FIG. 3 is a schematic side view of the sampler of FIG. 2.

The automatic soil sampler consists of two-wheel attachable trailer 16 having a frame which is mounted on wheels 19 (FIG. 3). Soil sampling probe assembly 20, a sample packaging station 23, a packed sample container or collector 24, and a marker system 25 for marking the path of the soil sampler.

The soil sample 65 that is removed from the soil is lifted over the container 24 on the trailer 16, and is deposited between two sheets of plastic, heat sealed into an individual package, and then the individual sample is stored until it is taken to a testing station.

The soil sampler 10 as stated is a trailing unit with a trailer 16 having a frame 18. At the rear of the frame 18 is the sampling probe assembly 20, which is mounted on a pivoting frame 29 to the frame 18. The frame 29 can be made with a pair of legs 29A and 29B (see FIGS. 5 and 6), that are pivoted as at 31 at the rear of the frame 18. A hydraulic actuator 32 is attached at one end to the frame 18 as shown at 33, and the rod end of the actuator is attached as at 34 to the frame 29. The frame 29 has suitable braces, and pivots as a unit about pivot axis 31 when the hydraulic actuator 32 is extended or retracted. The outer end of the frame 29 mounts a sampling probe assembly 20, including a wheel 37 that engages the ground, and is rotatably mounted with a suitable hub 38 supported on the frame member 29A, in a suitable manner to a shaft 40. The wheel 37 is permitted to rotate on shaft 40 which is supported in a hub 38 fixed to frame 29 with a support block 38A. A clutch and brake assembly of conventional design and indicated schematically at 41 is used to apply a brake to shaft 40 and disengage wheel 37 to permit it to freely rotate and to engage a clutch to drivably connect wheel 37 to shaft 40 and permit shaft 40 to rotate in another position. The two positions of the clutch, and brake 41 are controlled electrically and can be preprogrammed. A single revolution clutch, that is a clutch that permits one revolution of the wheel each time it receives a signal and otherwise locks shaft 40 while wheel 37 rotates, also can be used. The brake can be a positive stop gear and dog arrangement.

Figure 6:
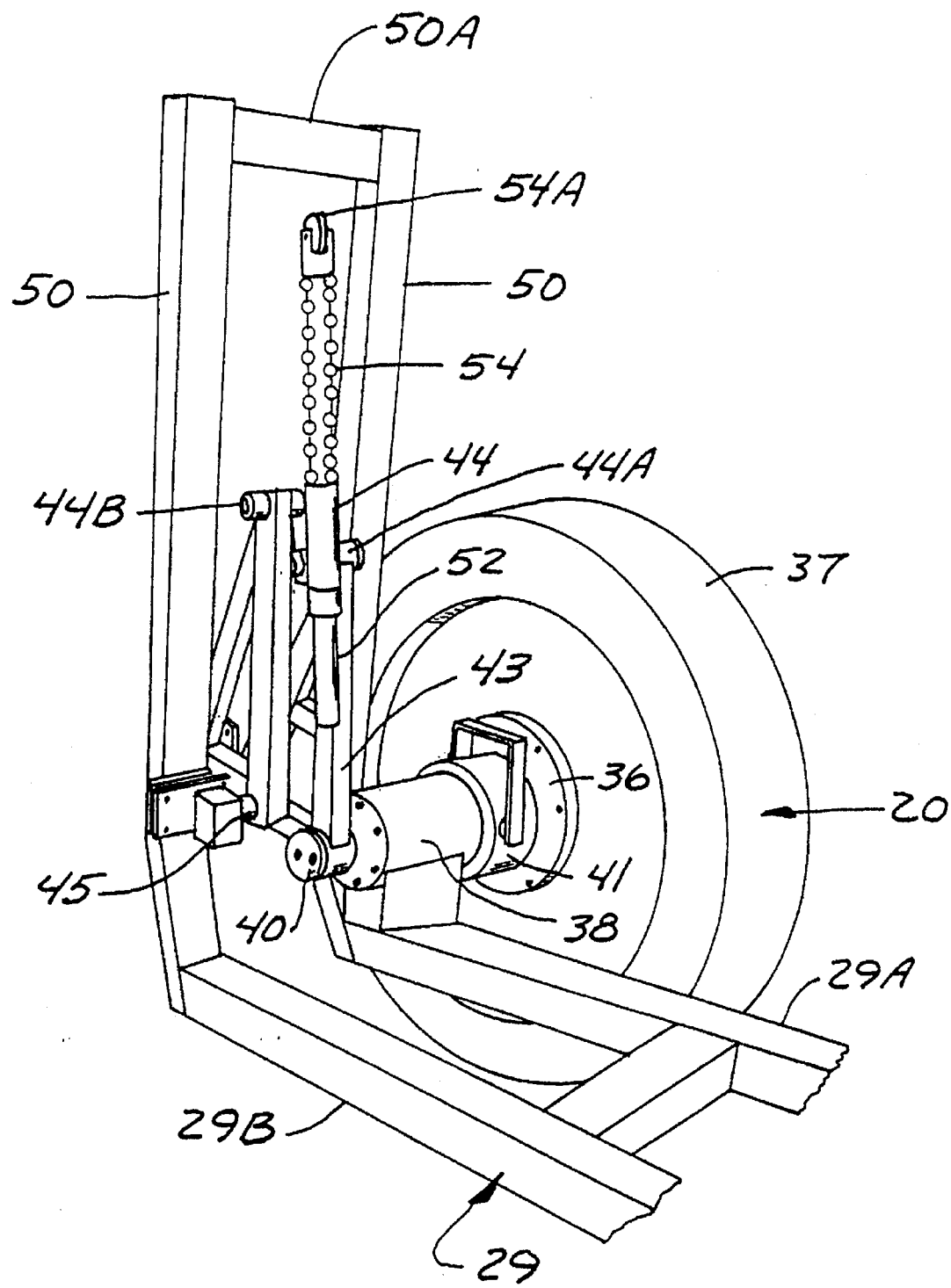
FIG. 6 is a perspective view of the soil sampling probe and drive wheel assembly used with the device of FIG. 5.

When the clutch engages the wheel 37 will drive the shaft 40. The shaft 40 in turn is drivably connected to a drive arm assembly 43, and as can be seen in FIGS. 5, 5A, and 6. An outer end of drive arm 43 pivotally mounted at 44 to a soil sampler probe mounting block 44. The probe mounting block 44 movement is controlled by arm 43 and a parallel linkage arrangement including a control link 46 having an end pivotally mounted at 44B to the probe mounting block 44, and also pivotally mounted at 45 to a support block 48 attached to an upright frame assembly 50. Frame assembly 50 attaches to the frame 29. The probe mounting block 44 rigidly mounts a tubular soil probe 52, which is of conventional design having an end portion 52A which will penetrate the soil. A cylindrical sample or core of soil will be received in the interior of the probe 52, when the probe penetrates the ground as shown in dotted lines in FIG. 5. An ejector rod 54 is slidably mounted in a bore in the probe mounting block 44, and will slide through the interior of probe 52, when pushed in the direction to eject the soil sample from the end 52A of the probe. A roller 54A is used at the outer end of the rod 54, and a spring 54B holds the rod 54 in its retracted position, as shown in FIG. 5, under normal conditions.

The parallel links comprising the drive arm 43 and the control link 46 will maintain the probe 52 in a substantially vertical position as it is rotated by drive arm 43 and the drive wheel 37 when the clutch 41 is engaged.

The start and end of each cycle is shown in dotted line position in FIGS. 5 and 5A. As can be seen in FIG. 6, the frame 50 has two upright legs, with a cross bar 50A at the top, but in the position shown in FIG. 5A, the probe 52 will be nearly at a maximum height position with the roller 54A spaced away from frame 50 slightly relative to when the clutch 41 disengages and locks shaft 40.

While the wheel 37 for the driving and sampling probe is shown as a smooth wheel, it can have suitable drive lugs or thread and preferably is a pneumatic tire.

Frame 29 and the upright frame 50 will move as a unit when pivoted by actuator 32, and carry the wheel 37 and probe assembly upwardly when the actuator 32 is extended. This will move the wheel 37 to the dotted line position shown in FIG. 5. As the frame 29 moves upwardly, it can be seen that the frame 50 and the roller 54A of the rod 54 will move to overlie a packaging unit support frame 60 that is supported on the trailer frame 18, and extends upwardly. There is an upright frame member 61, as shown at the rear of the trailer frame, and a horizontal overhead frame member 62 all of which are positioned so that they do not interfere with the trailer body or container 24 on the trailer frame 18.

The frame 60 includes an actuator plate shown at 64, at the front of the frame, and as the pivoting frame 29 is moved up over the top member 62, the roller 54A will engage the plate 64, and this will cause the rod 54 to be pushed into the probe 52 and expel any soil sample that is contained therein. Such a soil sample is shown at 65 in FIG. 5. The rod 54 can have an end plate that fits closely on the interior of probe 52 to aid in pushing the soil sample out.

Actuator plate 64 is made so that it will fit in between the upright members of frame 50. The cross member 50A is moving in an arc, as frame 29 pivots and the plate 64 is made to be clear of the cross member 50A as the cross member moves past the plate When the frame 29 is in its dotted line position shown in FIG. 5, the soil sample 65 will be ejected into a region between a pair of sheets of plastic shown generally at 68 in FIG. 5 that will be used for packaging the soil sample in packaging assembly 23 that is supported on a frame 70 of suitable design. Frame 70 in turn is supported on the frame 62. Schematically this arrangement is shown in FIG. 3 as well, with the soil sample 65 being pushed out of the probe 52.

Figure 11:
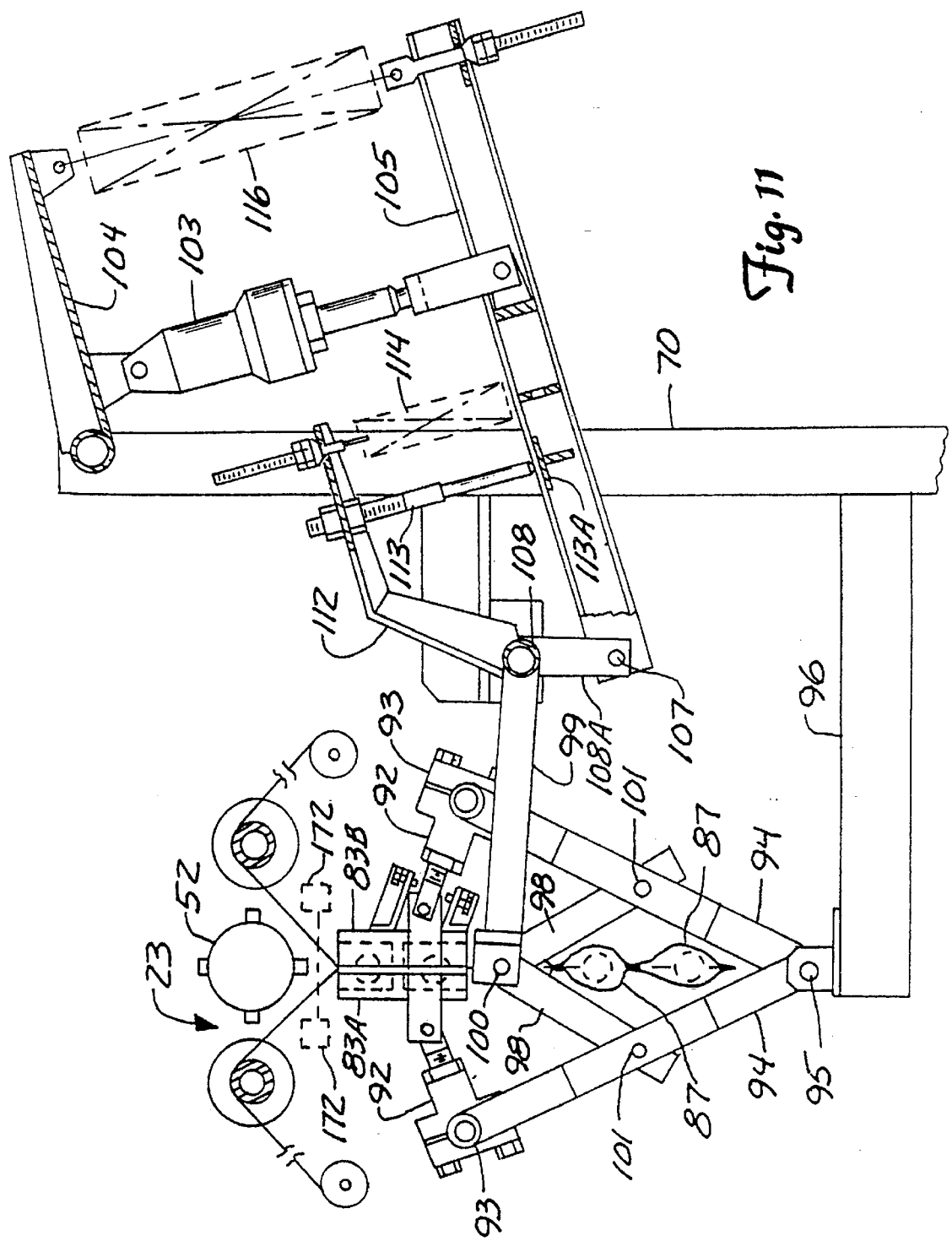
FIG. 11 is a side view of the heat sealer control linkage arrangement shown schematically and alone for purposes of illustration.
Figure 12:
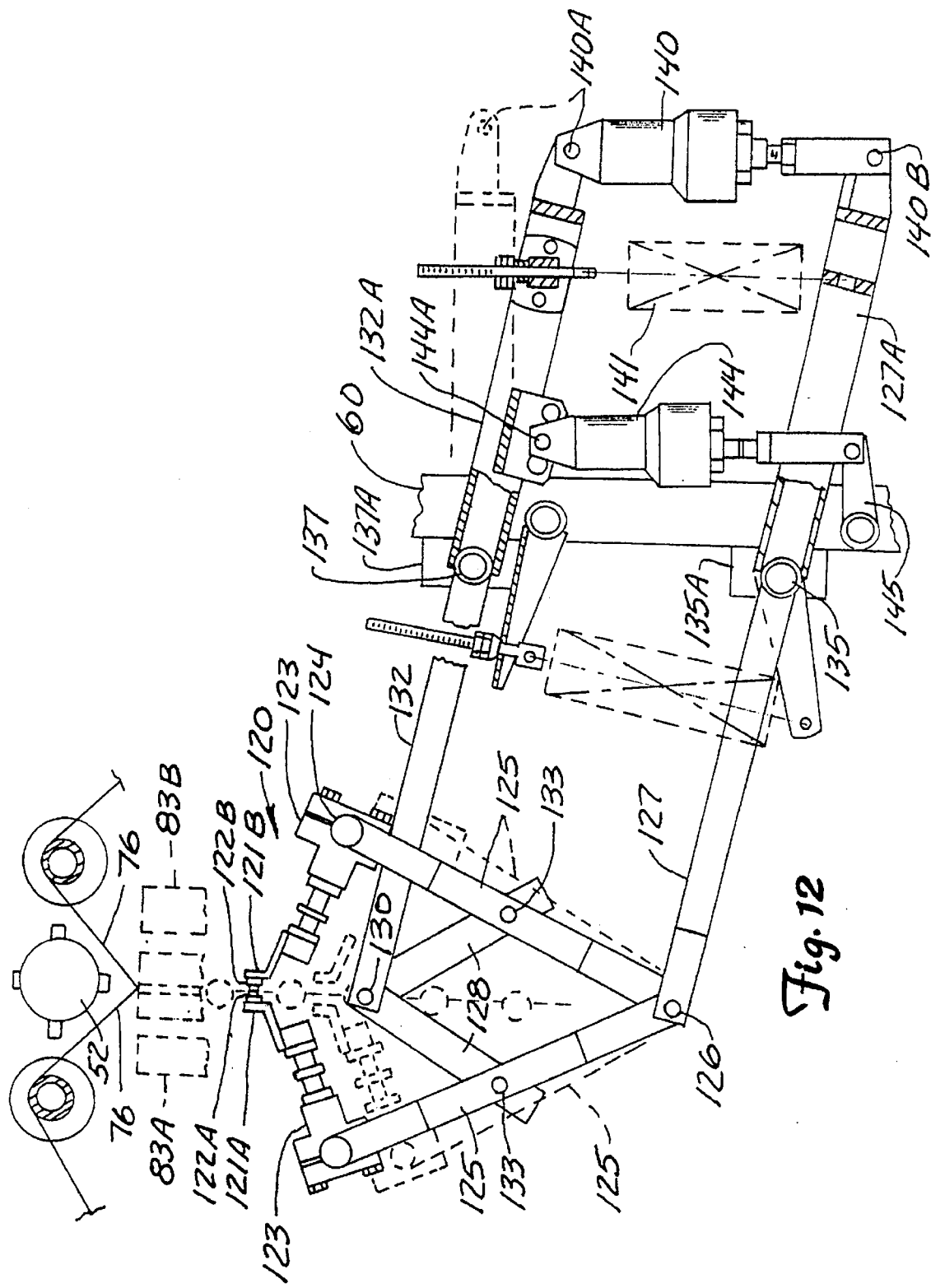
FIG. 12 is a side view of a package material moving or advancing linkage arrangement shown individually and schematically for purposes of illustration.

In FIGS. 11 and 12, the end view of the probe 52 in the position in which it is placed when the soil sample 65 is being dropped. It should be noted that the probe 52 is not aligned with the supply rolls of plastic in which the soil samples will be packaged, so the soil samples, when ejected will fall between the sheets coming from the rolls.

Figure 4:
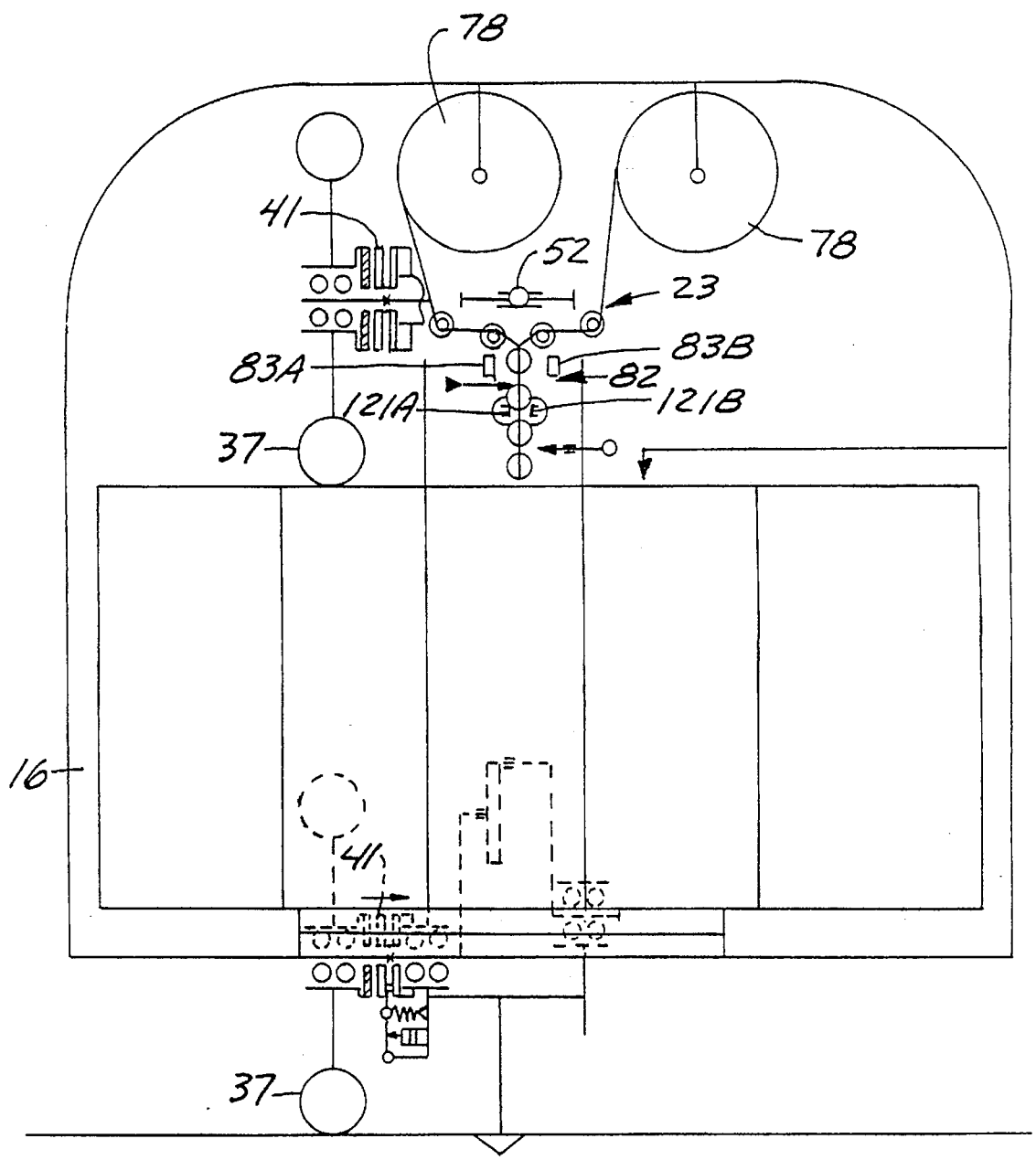
FIG. 4 shows a schematic rear view of the sampler of FIG. 2.

In FIGS. 9, 9A, 11, and 12, details of the packaging station 23 are shown. Sealed bags for the individual soil samples are formed in a long "chain" of samples. The schematic showing of FIGS. 3 and 4 is also referred to.

Frames 60, 62 and 70 are made to support the linkages. The packaging assembly 23 is mounted above a rear section or compartment of the trailer 16. The frame 60 is supported in an open center formed by four sample containers 165, as shown on trailer frame 18, and extends upwardly to above the trailer frame where overhead frame 62 and uprights 61 support frame 70 of the packaging station 23.

Figure 9:
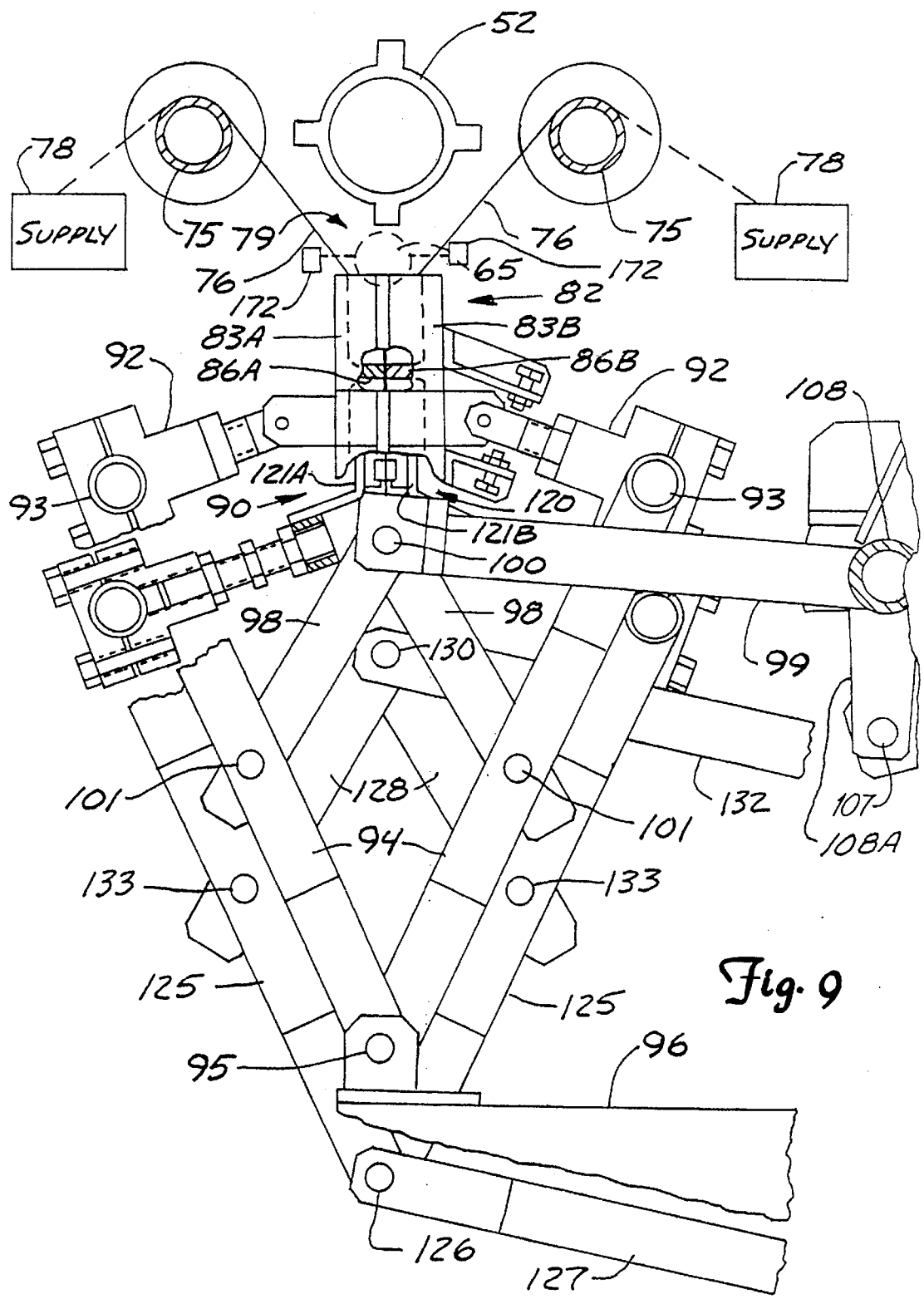
FIG. 9 is a fragmentary top plan view of a packaging station utilized with the soil sampler.
Figure 9A:
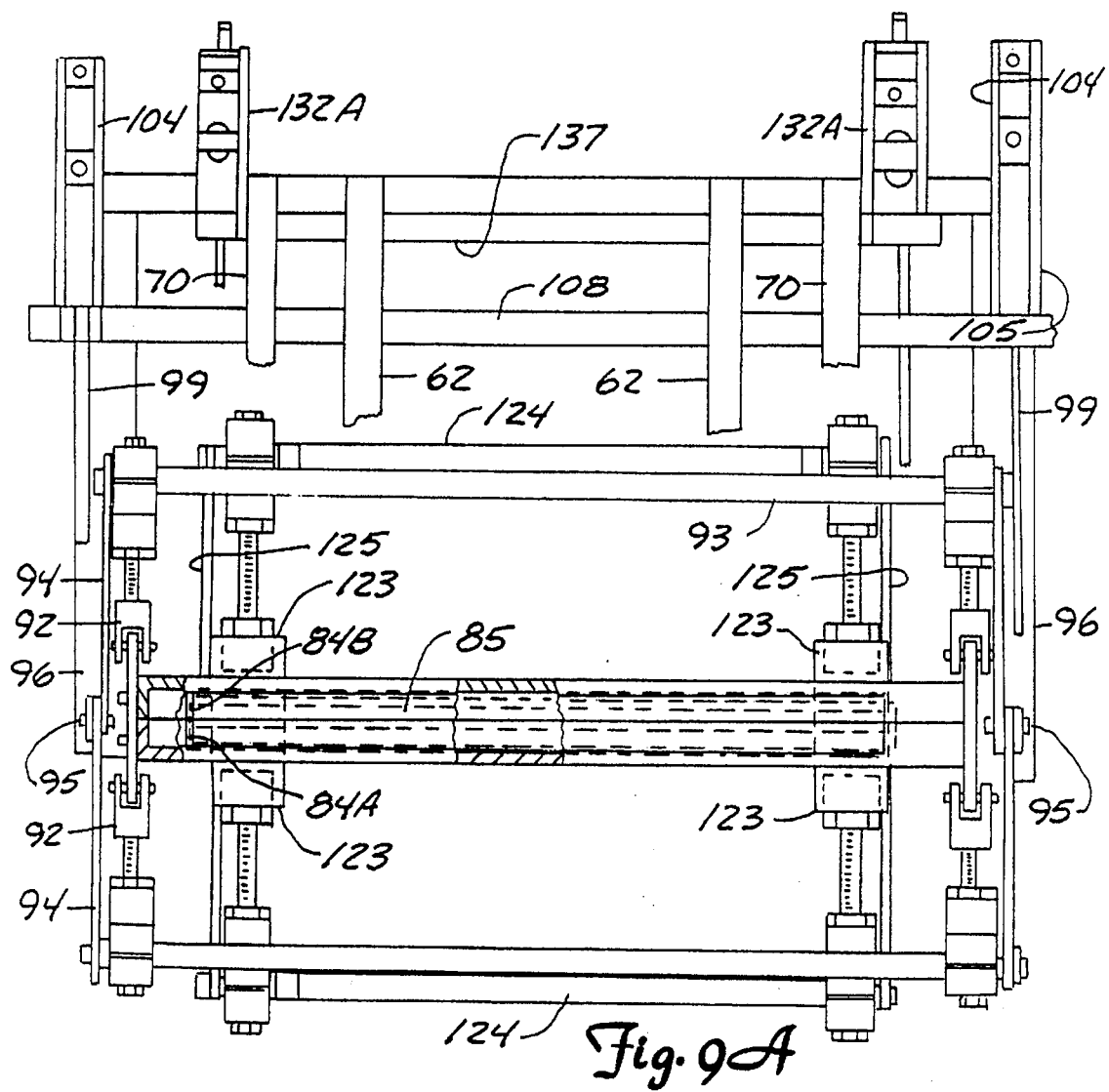
FIG. 9A is a side view of the packaging station used with the soil sampler.
Figure 10:
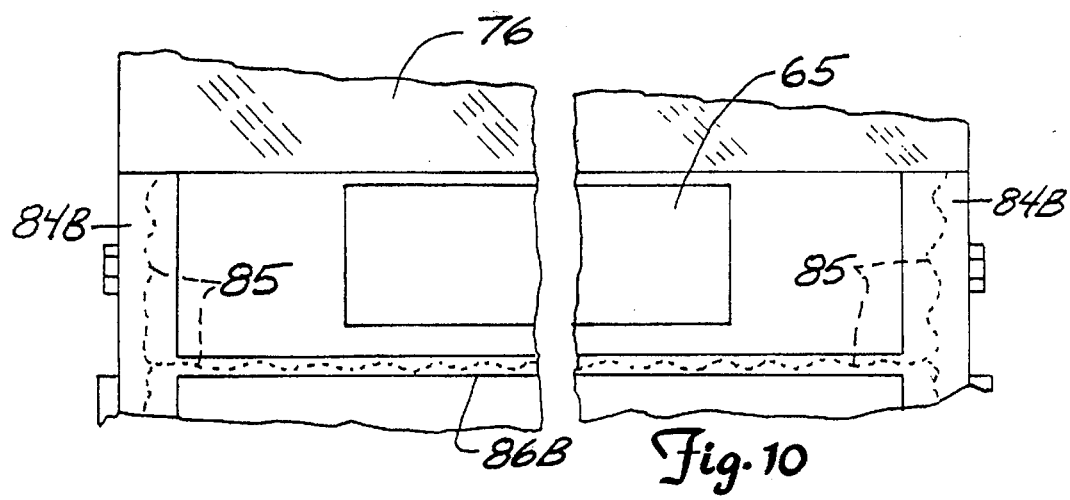
FIG. 10 is a view of a heat sealer section bar for the packaging system.

FIG. 9 illustrates an end view of the linkage used. The probe 52 is positioned between a pair of guide rolls 75, 75 that are rotatably mounted on opposite sides of the probe 52. The rolls 75 guide sheets of suitable plastic film indicated at 76 from suitable supplies 78. The supplies are large rolls that are rotatably mounted in a convenient location. The guide rolls 75 position the sheets 76 so that they are spaced apart sufficiently to permit the probe 52 to pass between, and so that when the probe 52 expels the soil sample 65, the samples will drop into the "bight" portion indicated at 79. The bight portion 79 is immediately above a heat sealing station indicated at 82 which has a pair of operable and closable heat sealers 83A and 83B. The heat sealers 83A and 83B are generally "H" shaped, with a long center bar 86A and 86B (parallel to the axis of the probe 52). The heat sealers 83A, 83B have end edge portions 84A and 84B that mate along a parting line and sealer 83A has a resilient gasket on its edges for compressing the plastic together. When the heat sealer 83A is heated with a suitable electric heater 85 (FIG. 10), and as the heat sealers 83a, 83B are moved together, they seal the two sheets of plastic from supplies 78 together to form a package. The edge portions 84A, 84B and bars 86A, 86B will mate to seal the parts of the two sheets 76 aligned with the mating surface, When the heat sealers are closed and positioned as shown in FIG. 9, the plastic sheets 76 will be spaced apart at bight portion 79 above the heat sealer sections, but will be fused together along the edges 84A and 84B, as well as along the center rib 86, to form a pocket that is open at the top. This sealing will also close off any previously formed pocket that is in the lower parts of the heat sealers 83A and 83B and below, and will seal along the edges or ends as well as along the top of the lower section to form a soil sample package 87 (FIG. 11).

The sealers 83A, 83B are controlled to reciprocate, and move away from the plastic sheets a sufficient amount so that a soil sample core indicated in dotted lines at 65 in FIG. 9 will be permitted to pass between the bars 86A and 86B to permit the sealed plastic sheets to be pulled down for receiving the next soil sample. When the sealers 83A and 83B are opened or retracted, a soil sample package advancing mechanism shown at 90 will be actuated to pull the plastic sheets and the package that has been previously partially formed and the soil sample for that package 87 downwardly sufficient to advance the plastic sheets one step. The soil sample that previously was above the bars 86A, 86B now would be below the bars 86A, 86B. The sealers 83A, 83B are then closed again to seal the top half of the previously formed package and enclose that soil sample, and form the bottom half of a new package 87. The bottom half of the new package is separated from the previous soil sample by the seal along bars 86A, 86B. The package advancing mechanism and the operation of the heat sealing members are synchronized to achieve this result. The packages 87 are left in a strip.

The individual linkages for the heat sealing station 88 and advancing mechanism 90 are shown separately in FIGS. 11 and 12, and are shown together in a front view relative to the overall soil sampler in FIGS. 9. A schematic top view is shown in 9A. These figures illustrate one way that linkages can be mounted, but other ways can also be utilized.

The two heat sealer sections 83A and 83B extend across the packaging station and are mounted on opposite ends of each of the heat sealer members. The links 92 are connected to cross pipes shown at 93 so that they form a "yoke" that extends to opposite ends of the heat sealers 83A and 83B. A pair of arms 94, respectively are connected to opposite ends of the tubes 93, on each end of heat sealers and the pair of arms 94 on each end are mounted to a common pivot pin shown at 95. The pin 95 is supported on a bracket connected to a fixed arm 96 that is supported back to a frame member of frame 70. A scissor type linkage 98 is connected between the arms 94 on each end of the heat sealers 83A, 83B, and is operated through a control arm 99 that pivoted as at 100 to first ends of both of scissor links 98 on each side of the heat sealers. The pivot 100 is a common pivot for the pair of scissor links 98. The opposite ends of the scissor links 98 are connected at pivots 101 to the respective arms 94.

The arms 99 are fixed to a cross tube 108 that is pivoted on supports forming part of frame 70. The cross tube 108 and arms 99 are operated by a hydraulic actuator 103 that in turn is mounted to a fixed arm 104 (FIG. 11) attached to the frame 70 in a suitable manner, and in a proper position by utilizing a fixed tube 104A to properly position the arm 104. The actuator 103 in turn has its rod end connected to an arm 105 which is part of a pivoting assembly including the arm 99. The arm 105 is pivoted at 107 to a control arm 108A that is attached to cross tube 108 to which arms 99 are attached.

The tube 108 has a stop and control arm 112 attached thereto as well. A stop member 113 is mounted on this control arm and overlies a cross piece 113A on the arm assembly 105, and provides an abutting stop as arm 105 pivots upward about pivot 107. A spring 114 is attached to the control arm 112 as well, and provides a force urging the arm assembly 105 toward the stop 113.

As the actuator retracts, the arm 105 will be lifted against a stop member 113 and arm 99 will move the pivot 100 downwardly and separate the upper ends of the links 94, and thus move the arms 92 apart, thereby separating the heat sealers 83A and 83B.

The stop 113 is adjustable and when the actuator 103 is retracted, the amount that the arms 99 move can be adjusted. The force from the actuator 103 will cause pivoting of the tube 108 relative to its support back to the frame 70, and cause the scissor linkage to open up the heat seals 83A, 83B. The spring 114 will be extended when the actuator 103 extends and urges the arms 99 upwardly as arm 105 moves downwardly. The closing of the heat sealers by action of the scissor links as pivot 100 moves upwardly is under spring force of spring 114 when the actuator 103 is fully extended and the heat sealers are in engagement, plate 113A is spaced from the end of stop 103 so the heat sealers 83A, 83B are spring loaded together.

FIG. 12 provides a more detailed view of the linkage utilized for the sample package advancing mechanism 90, mechanism 90 pulls the packages containing the soil sample downwardly to pull lengths of plastic sheets from the supply rolls 78 after the heat sealing members 83A and 83B have been retracted or opened so that they are not engaging the plastic sheets 76.

The frame 70 is used for mounting a linkage assembly 120, which includes a pair of sheet clamps indicated at 121A and 121B that have resilient pads 122A and 122B on each side of the plastic sheets, and these pads are positioned so that they will engage the sheets approximately at a location where the previous cross sheet heat seal was made by the bars 86A and 86B. The pads are essentially parts of the clamp assembly including a separate pair of brackets 123, on each outer side of the two plastic sheets 76. The pair of support brackets 123 on each side of the plastic sheet are mounted onto cross tubes 124, which extend across the width of the plastic sheets. Support links 125 are attached to opposite ends of each tube 124. The support links 125 on each end of the mechanism have outer ends pivotally mounted at a common pivot 126.

A pair of scissor links 128 on each end of the package advance mechanism pivotally mounted as at 130 at their first ends (on a common pivot) to a second arm 132. The arms 127 and 132 form a parallel linkage, as will be explained. The opposite ends of the scissor links 128 are pivotally mounted as at 133 to mid portions of the control arms 125, 125 on each end of the package advance mechanism.

The arms 127 are mounted on a cross tube 135, and the cross tube has arm assembly 127A extending in opposite directions from arms 127.

The arm 132 is mounted onto a cross tube 137, that extends across the width of the package advance mechanism so that the arms 132 on opposite sides of the mechanism are joined together to move in unison. Arm portions 132A are fixed to tube 137 and extending in an opposite direction from the arm 132. Arm portions 132A are used as actuation portions.

The ends of the arm portions 132A and 127A have a hydraulic actuator 140 mounted between them. The actuators 140 are mounted as at 140A to the end of the arm 132A, and as at 140B to the end of the arm 127A. The tubes 135 and 137 are pivotally mounted in suitable supports 137A and 135A to the frame 70, and supported in a suitable manner in the proper lateral location. When the actuator 140 is extended, pivots 130 and 126 will tend to move together causing the scissor links 128 to spread the arms 125 apart, so that the clamp members 121A and 121B will separate. A tension spring 141 can be provided between the arms adjacent the actuator 140 to provide a spring load to cause the actuator 140 to retract under the spring load and to spring load the clamp members 121A and 121B together.

The clamps 121A and 122A can be moved down to their dotted line position pulling the plastic sheets with them, along with any soil sample illustrated in dotted lines after the heat sealers 83A, 83B have opened by operating an actuator 144 that is mounted onto a fixed arm 145 that is attached to the frame 70, and which has its opposite end connected to the arm portion 132A. When the actuator 144 is extended, the mounting pivot 144A where the actuator mounts to the arm portion 132A will be moved upwardly as shown in FIG. 12 and this will cause the parallel links 127 and 132 to pivot on the tubes 135 and 137 and in turn move the pivots 130 and 126 downwardly in unison because of the parallel linkage arrangement. The actuator 140 acts as a link at one end of the parallel linkage.

Once the actuator 144 has moved the partially formed pocket at the top half of the heat sealers and the finished package below the heat sealers downwardly by a selected index amount, the clamp members 121A and 121B will be opened or retracted by extending the actuator 140, which moves pivots 126 and 130 together and spreads arms 125 as shown by dotted lines in FIG. 12. The cylinder 144 will then be returned to its solid line position shown at FIG. 12 with clamp members 121A, 121B aligned with a heat seal line for a sealed package containing a soil sample. The clamping takes place above a soil sample that has been fully packaged.

In the position shown in FIG. 12, the soil sample 65 indicated in dotted lines just below the dotted line showing of the heat sealers 83A and 83B will be held in a package that has been sealed on ends, with a cross sheet heat seal underneath the soil sample. The heat sealers 83A and 83B are again actuated and a soil sample just below the heat sealers is fully encapsulated in a plastic package with the complete heat seal at the top.

All of the soil samples shown in dotted lines will be in packages that will be left in a continuous chain. Each of the packages will be identified in a suitable manner, either by way of manual identification, or by knowing the start and end position of each pass or path and the distance from the start of a pass to correspond to the known position of the sampling probe when the particular soil sample was removed from the soil.

Figure 7:
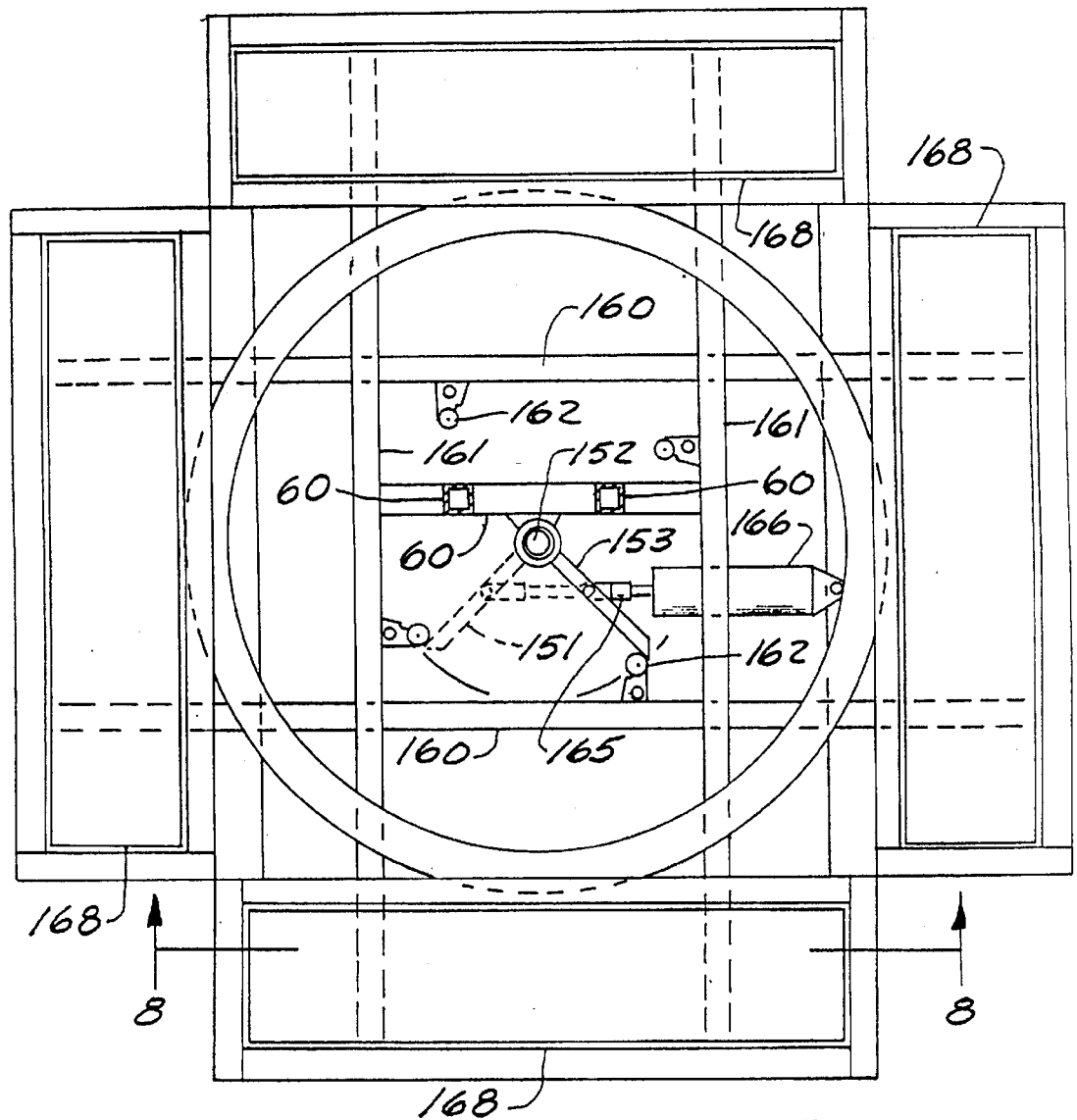
FIG. 7 is a top schematic view of an indexing device for indexing a sample storage trailer about an upright axis.
Figure 8:
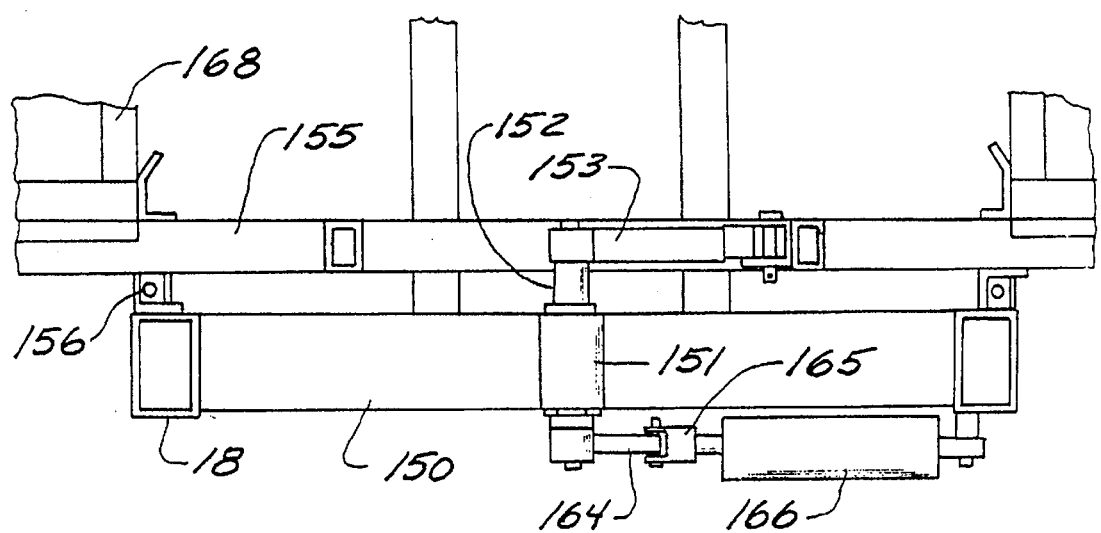
FIG. 8 is a view taken as on line 8—8 of FIG. 7.

In FIGS. 7 and 8, a schematic showing of a turn table type trailer assembly is illustrated. In FIG. 8, the main frame 18 is shown with a cross member 150 that mounts a hub 151 in which a turn table actuator shaft 152 is rotatably mounted. Actuator shaft 152 has an arm 153 attached thereto, which as shown, has the one beveled end, and is used for indexing a trailer rotating frame 155. The rotating frame is suitably mounted on a wall bearing arrangement indicated at 156 onto the frame 18, and the frame 18 can have suitable supports underneath the turn table frame 155 as desired. The turn table frame 155 has a number of cross members including inner cross members 160 and 161 on which drive rollers 162 are suitably placed. The drive rollers 162 as shown are at four different locations, and they are aligned vertically with the drive arm 153. The opposite end of the shaft 152 has a link 164 that is connected to the rod end 165 of a hydraulic actuator 166 which in turn is connected to the frame 18. When the actuator 166 extends to its dotted line position as shown in FIG. 7 it will drive one of the rollers 162 and will rotate the turn table 90°, as shown by the dotted line position of the arm 153. In this manner, four different sample hoppers or containers 168 removably mounted onto the turn table frame 155 can be positioned underneath the packaging assembly. The sealed packages of soil samples are deposited in the containers. These containers or hoppers 168 can be removed from the frame utilizing a suitable forklift, or other means, and then they can be transported to an analysis laboratory for running a complete soil analysis on the individual soil samples.

Figure 13:
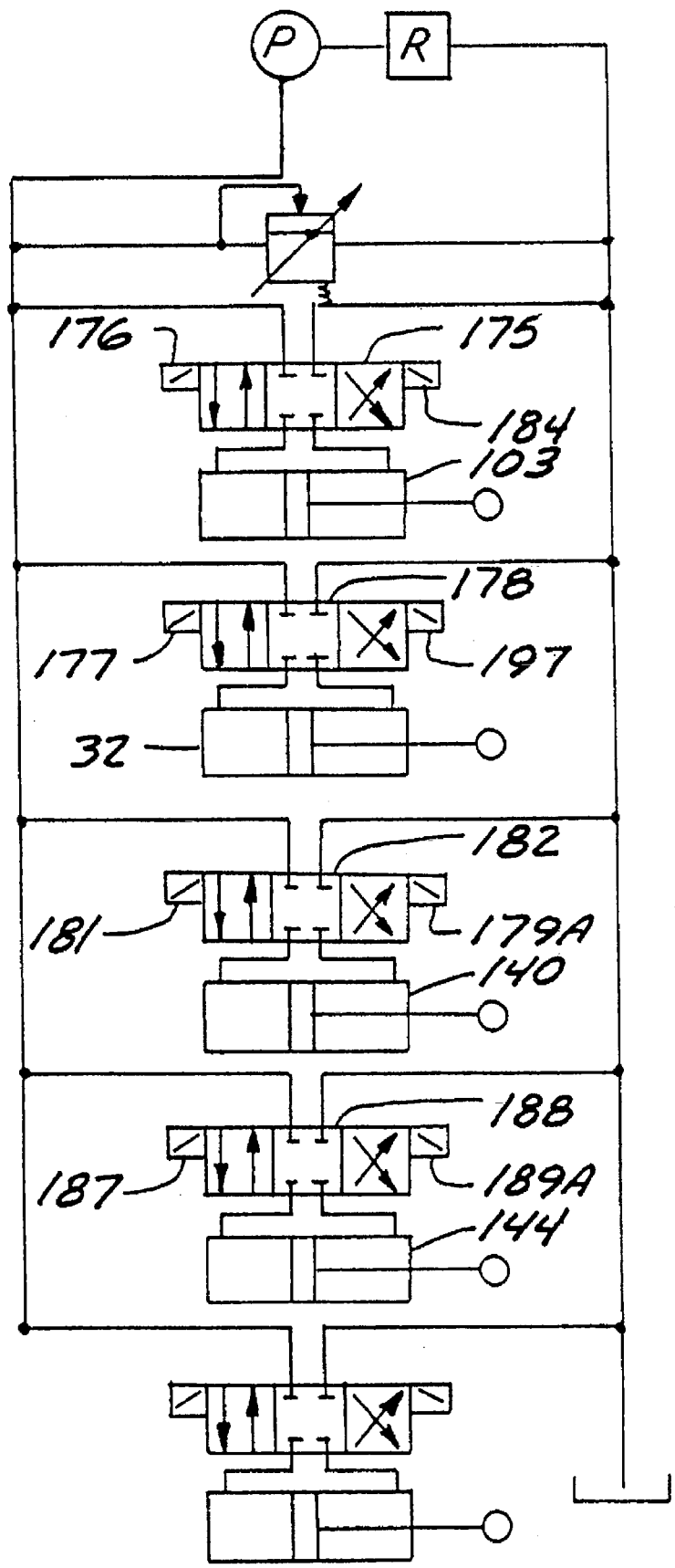
FIG. 13 is a schematic hydraulic diagram used with the automatic sampler.
Figure 14:
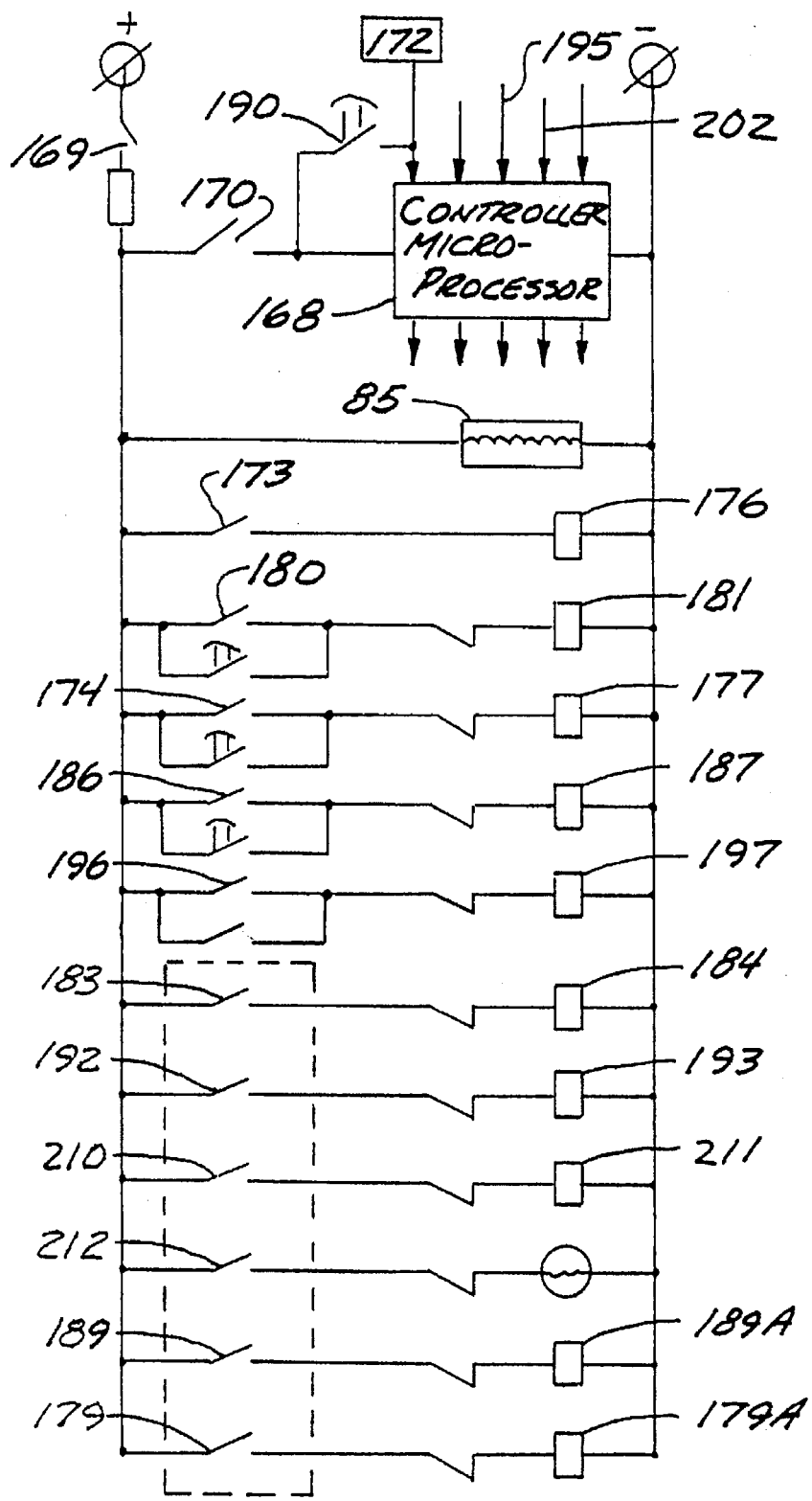
FIG. 14 is a circuit diagram of the controls for the automatic sampler.

The automatic soil sampler is placed at the beginning of the first pass in the field, and a controller 168 is turned on by a switch 169 of the control panel (FIG. 14). Heater 85 begins to operate when the switch is turned on. After the heater 85 reaches operating temperature, the controller turns on a switch 170 that operates either on a time delay or with a thermal sensor. A sensor 172 indicates that the probe is above the packaging station, and the controller 168 generates control commands to close switches 173 and 174 (FIG. 14). Switch 173 energizes a solenoid 176 so that the actuator 103 for the heat sealers is extended by operating a valve 175 (FIG. 13) and the arm 99 is moved up to close the heat sealers 83A, 83B. The plastic sheets are then sealed together with the heat sealers 83A and 83B, to form an open top package into which a soil sample can be dropped.

A switch 174 energizes a solenoid 177 to operate a valve 178 (FIG. 13), in turn operate actuator 32 and lower the frame 29 so that the wheel 37 engages the ground. After the delay necessary to seal the plastic sheets together to form the open top package, the control unit generates a signal to close the switch 180 to energize a solenoid 181 which actuates a valve 182 (FIG. 13) in a direction to operate the actuator 140 to retract and thereby clamp the plastic sheets between the clamps 121A and 121B.

Next, in the sequence, the controller 168 will open switch 173 and actuate a switch 183 to operate a solenoid 184 for valve 185 and cause the actuator 103 to retract, and pivot the arm 99 downwardly operating the scissor linkages to move the heat sealers 183A and 183B away from the plastic sheet, after of course, the heat seal has been completed.

When the heat sealers are opened the controller closes a switch 186. Then, the controller will actuate a switch 186 to energize a solenoid 187 to operate a valve 188 that will cause the actuator 144 to extend and move the arms 127 and 132 and the clamps 121A, 121B down, to in turn pull the sheet material that had been previously heat sealed in heat sealers 83A and 83B downwardly a desired indexed amount. The partially formed package is pulled through the open heat sealers.

At a desired time, after the plastic sheets have been advanced downwardly, the switch 183 will be opened, relaxing the solenoid 184 and switch 173 will close energizing the valve 175 to extend the actuator 103 and reclamp the heat sealers 83A and 83B in a new position on the plastic sheets to seal the top of the previously open top package and simultaneously form another open top package that is open at the upper ends of the heat sealers 83A and 83B.

The controller will open switch 180 and close a switch 179 that actuates a solenoid 179A to move valve 182 so the actuator 140 extends and the clamps 121A and 121B open. The controller will then at an appropriate time, actuate a switch 189 and open switch 186. Switch 189 energizes a solenoid 189A to cause valve 188 to move actuator 144 to raise the clamps to position them as shown in solid lines in FIG. 12, ready to repeat the advancing of the plastic sheets at the appropriate time.

At the start of each field pass as a way of identifying the soil samples taken during each run, a manual switch 190 is used to input a signal to the controller simulating a signal from sensor 172, to form three empty bags to indicate the start of a run or pass along the field. Then, a mere count of each succeeding package is needed for identifying the individual samples, and the location where each sample was taken so when applying fertilizer, for example, the proper amount is applied as determined by the analysis of each soil sample. Since the first pass is known the end and start of each subsequent pass also can be counted. The sequencing of the manual switch 190, can be delayed somewhat from one another so that the package sequence will be repeated. In the manual sequence, wheel 37 would continue to engage the ground and frame 29 would not be raised and lowered.

When the suitable indication of a start of a field pass or run has been made, as disclosed, by having three empty sealed packages formed in a row, the vehicle 11 will begin its motion along the path as shown in FIG. 1. Odometer sensor 11A will provide a signal of distance after the vehicle has moved a desired amount from its start. The controller will close a switch 192 to energize a solenoid 193 which will cause the clutch-brake 41 to be moved to engage the clutch shown at in FIG. 3, to couple the wheel 37 to the shaft 40, and release the brake or lock (41B in FIG. 3) so that the shaft 40 can be rotated as the wheel 37 turns.

The arm 43 will drive the probe mounting hub 44, and the probe 52 so that the probe will enter the ground as shown schematically in FIG. 3, while the probe maintains its vertical orientation. The forces for inserting the probe into the soil is provided by holding the actuator 32 at its lowest position, and the pressure in actuator 32 can act against a suitable relief valve so that a suitable amount of soil for a sample is captured in the probe, and held inside the probe by the friction force. If the probe encounters a solid object such as a stone or the like, the wheel 37 will actually be raised up against the force of the cylinder 32 because of the yielding permitted by the relief valve and the probe will continue to penetrate the ground while the vehicle moves forwardly to rotate the shaft 40 until such time as the wheel 37 again contacts the ground and lifts the probe up from the soil.

When the probe 52 reaches its upper position in rotation with shaft 40, as sensor illustrated schematically in FIG. 3, provides a signal along a line 195 to the controller 168 indicating that a sample has been received in the probe. The controller opens switch 192 to disengage the clutch 41A and set the brake or lock 41B. Also, the controller opens switch 174 and closes a switch 196 to energize a solenoid 197 and operate the valve 182 in a direction to extend the actuator 32 and lift the frame 29 and the probe assembly upwardly to its position overlying the packaging station. The soil sample comprising the core of soil taken is ejected by movement of the rod 54 as the roller 54A acts against the plate 64. Schematically shown, sensor 172 (FIG. 3) indicates when the probe 52 has reached its ejection position, so that the soil sample 165 is removed from the probe 52, and there is a signal input along a line 202 to the controller (FIG. 14). This is the first sample in a vehicle path, and an appropriate mark was made on the open top package that had just been formed by the heat sealers 83A and 83B for identification of the sample that is dropped into the open top package.

The operational cycle is then repeated, and the probe is lowered by operating the actuator 32 in an opposite direction by opening the switch 196 and engaging switch 173 and solenoid 177 to operate the valve 182 in an opposite direction to cause the actuator 32 to retract and lower the frame 29. The wheel 37 and probe again will be held in place with a suitable relief valve as explained.

The process repeats with the sealers 83A and 83B opening, the clamps 121A and 121B being moved downwardly by operation of the linkage and actuators, and then the heat sealers being reclamped, and the clamping mechanism 121A and 121B being reclamped at a new position on the sheets. Many of the solenoid operated switches have manual bypasses, as illustrated, so that manual cycling can occur if desired. During the operation, if a sample is not packed into the bag or a sample is not available, due to encountering a solid object or some other cause, the sensor 20 that is used for indicating a sample present, along a line 201, is activated, and the control unit generates a command which closes a switch 212, to light a warning light 213. The power can then be turned off until appropriate adjustment is made manually and then restarted.

The sealed packages containing the soil samples, are again left attached to each other until one of the containers on the trailer is filled, and then the containers are cycled, after the plastic sheets are slit, so that a new container is below the packaging assembly. The sealed packages can be delivered to a testing station, for processing in sequence, with each analysis being keyed into a particular location on the field as determined by the location of the sampling probe for each sample and the information provided by the odometer signal. The microprocessor controller 165 can record the different location on each pass as desired and thus analysis in each grid location for individual soil samples can be tied directly back to that location for fertilizer application. Numeral location of samples on each pass also can be used with the respective passes being identified by leaving empty packages between the end of one pass and the start of another.

Figure 15:
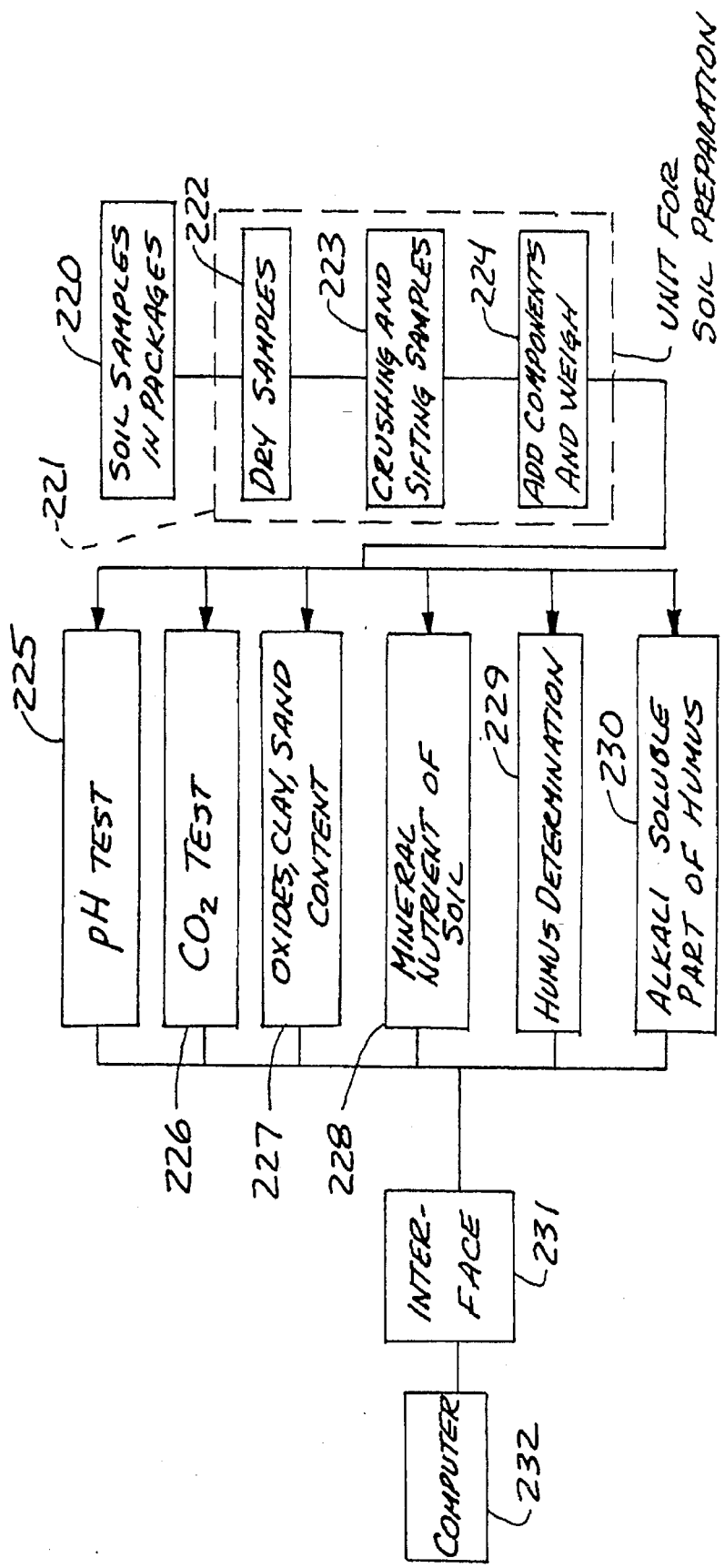
FIG. 15 is a block diagram of a soil sample analysis work station.

The workstation 219 for sample analysis includes several units as illustrated in FIG. 15, and the important feature is that the individual samples are maintained throughout the testing so that each sample from each grid is individually analyzed, and then the individual needs of fertilizer for that grid can be provided.

In FIG. 15, once the packages of individual samples are obtained, the container or string of packages indicated by the box 220 is put through a soil preparation unit 221, which is outlined in dotted lines. This includes the drying of the soil represented by box 222, the crushing and sifting represented by box 223, and the addition of liquid or other components that are necessary for normal soil sampling, and also the weighing of the sample represented by the box 224. The soil samples are then placed into a number of test procedures, which can be done sequentially, but each individual sample is tested in a pH line, represented by box 225, carbon dioxide represented by box 226; oxides, sand, and clay percentages are determined by box 227; a line for determining the mineral nutrients of the soil represented by box 228; humus determining line 229; and a line or station for determining the alkali soluble parts of the humus indicated by box 230. The tests can be run with portions of the sample, or it can be run in sequence, but each separate soil sample 65 is analyzed for these various components at a minimum, and additional tests can be conducted as desired.

An interface 231 is provided for the test result outputs, and then the tests are analyzed in a computer 232. The information can be stored in memory and transferred to disks for use with on board computers of a fertilizer applicator or other vehicle. The type of tests can be those that are known, or additional tests, as they are developed. The analysis will give a determination of the amount of fertilizer that is needed for that particular small grid as exemplified by each soil sample.

Figure 16:
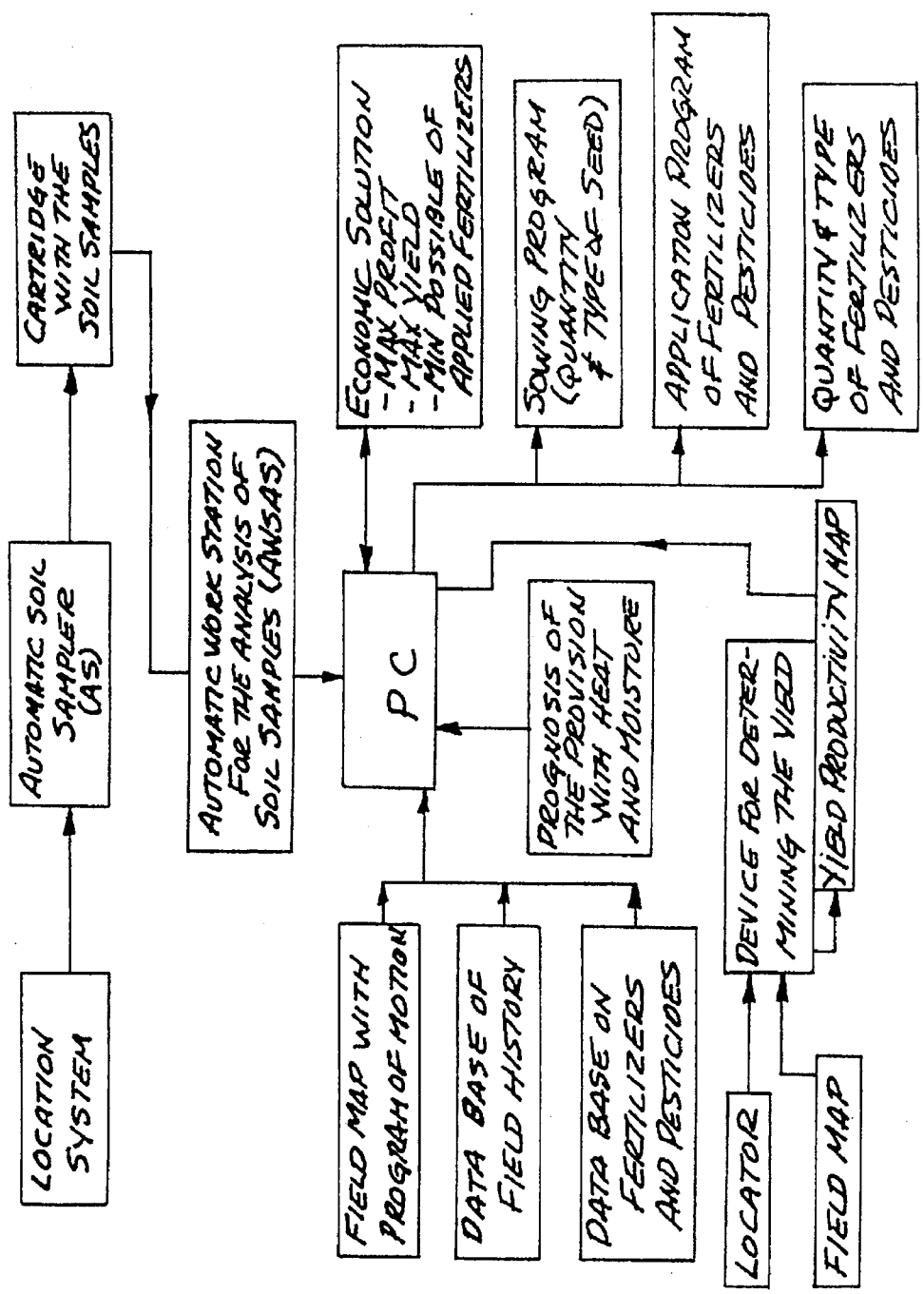
FIG. 16 is a block diagram for preparing a program of material application onto a field from which soil samples are taken.

FIG. 16 illustrates a functional diagram for types of information that can be determined utilizing the functions that were obtained by the soil analysis. The inputs to the personal computer are is shown. The inputs have been previously described including the location system for the location of the samples, the automatic soil sampler, the sealed package with the soil samples, and then the work stations that analyze the individual soil samples. Additional inputs to a computer program can be as those shown including a field map, a data base for fertilizer and pesticides, a data base of field history, and other inputs as desired. The computer memory stores in its data base or as an input, data on crops (kind of crop, seed variety and price, fertility requirements, estimated price of harvested crops). The computer stores data on fertilizers and well such as type, quantity of the active substance per mass unit, and application costs. Herbicide information such as type, unit price, application cost is stored. Also environmental factors such as heat effect and moisture expected provide input. Other economic factors can be programmed in. The outputs can be an economic solution such as maximum profit, maximum yield, and minimum possible of applied fertilizer according to developed programs. Also the application of fertilizers and pesticides based on the soil analysis can be determined, as can the quantity and type of fertilizers and pesticides needed. Based on the soil analysis a program for seeding or sowing seeds in each individual grid can be developed.

A field map having a predetermined scale can also be loaded into the PC. For example, a field map which indicates all obstructions, such as power poles, clusters of trees and bushes, ravines, streams, boggy areas, irrigation vents, etc., can be placed in the memory of the PC by means of scanning in a field map, or by means of GPS coordinates used to identify such areas.

A route is then elaborated for the soil sampler based on the field map, the coverage width of the sowing unit, the coverage width of the fertilizer applicator, the sampling rate of the soil sampler, and the path length of travel of the soil sampler. The route and sampling rate are then entered into the PC for subsequent processing, or for subsequent viewing by an operator. In addition, a crop harvester motion pattern can also be elaborated based on the soil sampler's motion pattern, and based on the crop harvester's coverage width and process features. All of these patterns can be output graphically for the convenience of operators, and can be entered into necessary on-board computers for respective field equipment.

The soil is then sampled according to the motion pattern provided by the PC for the automated soil sampler. The rate of sampling may be determined by the operator and may be corrected on-the-fly, depending on the output provided by the PC. During the soil sampling process, the operator can also evaluate compaction and air permeability for various locations in the field, and input data indicative of those items to an on-board computer. This information is used in assessing future field cultivation requirements.

The soil samples are then analyzed. Data groups are gathered for each sampling point during the soil analysis process. The data groups are arranged along the soil sampler motion pattern, and in grids perpendicular to that pattern. Thus, the data are arranged in an array.

After the data array is arranged, it is analyzed for "maverick" data and errors which are to be excluded from the subsequent analysis. These data points are replaced with average values based on surrounding data points.

The data array is then analyzed with respect to the soil sampler motion in order to statistically determine an optimal grid size for future sampling processes. In other words, if the analysis results changed drastically from point to point in the previous soil sampling process, then at that point in the field, it would be beneficial to take samples closer together. The results of this analysis are provided to the PC. The data array which is formed after the above statistical processing and after soil analysis is entered into a data base for the field under analysis. Planting rates are calculated for every point received in the data base, and application rates of chemicals and fertilizers are calculated in the same fashion.

According to the obtained data, the crop manager is able to make a decision as to planting rates and application rates, enter necessary correction data, and enter other criteria, such as financing, expected prices, potential contracts for sales. The manager is then able to repeat the calculation of planting rates and application rates based on these criteria. Finally, the application program is determined for planting and for chemical fertilizer application. The program is then preferably transferred to an on-board computer of the machine used in planting, such as variable rate seed drill. The seed drill is operated according to the program to obtain the calculated planting rate.

In addition, the program for application rates is preferably loaded into an on-board computer of a self-propelled applicator and of a variable rate applicator for fertilizers. Chemical spraying is conducted according to the program. In addition, the variable rate fertilizer applicator preferably has changeable sizes of bins for different fertilizers. The bin volumes are measured in order to prepare a necessary quantity of fertilizer to be loaded therein. After the applicator is loaded, the operator starts motion according to the predetermined route and emptied bins are subsequently reloaded and container sizes are changed automatically based on an output from the on-board computer.

Crop yield is also monitored. When monitoring crop yield, the harvester moves according to the predetermined pattern and obtains data indicative of crop yield and vegetable residues at the points sampled by the soil sampler. This data is entered into the data base associated with the given field.

Once all this information is obtained, it is loaded into the PC, along with the available dependencies of crop yield on physical and mechanical properties, the performances of soil, the availability of macro and micro elements in the soil, the quantity of applied fertilizer, and the availability of heat and moisture. These are all analyzed by correlation analysis techniques using non-parametric hypothesis checking. The major and minor parameters are distinguished using parametric factor and dispersion analysis, and the preciseness of the determined dependencies are evaluated using confidence level evaluation techniques. One such dependencies are determined, the above calculations are performed, preferably, in order to provide correction factors in the regression equations used to determine optimum values.

Subsequent application rates are calculated based on the soil sample analysis results, the applied substances, crop yield monitoring, and consumption by the forerunner crop. As will be described below, these calculations are performed accounting for humification of vegetable residues, and available soil models.

Figure 17:
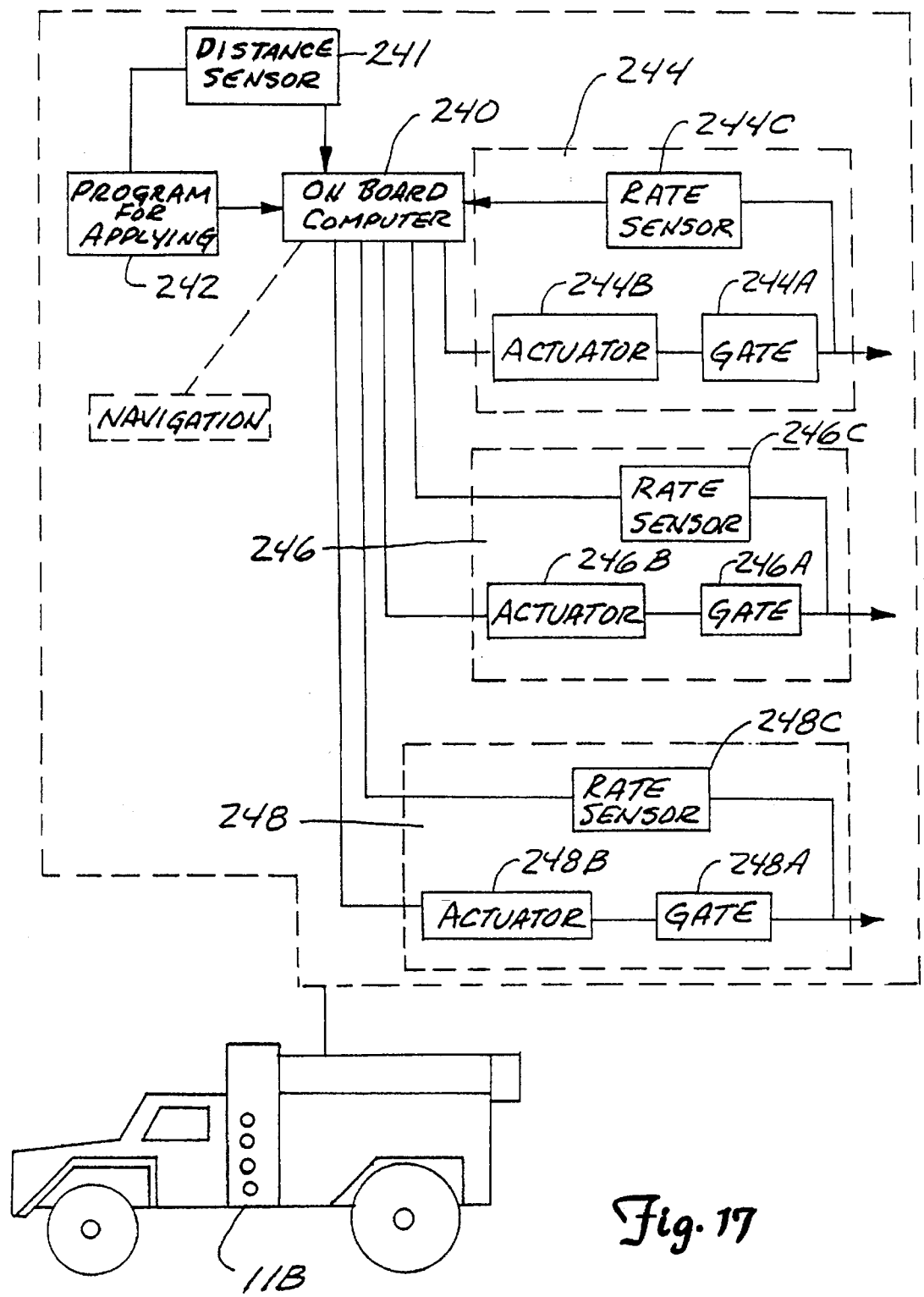
FIG. 17 is a block diagram of an automatic system for fertilizer application on the same field using a program developed from individual soil samples.

FIG. 17 is a representation of the application of fertilizer or pesticide, or even seeding based upon the analysis of the individual soil samples. A program for applying is developed, based on the soil analysis of each individual sample position where a sample has been taken. A vehicle fertilizer spreader 11B has an on-board computer 240 and a distance sensor 241. The distance sensor can be an odometer that would be capable of providing the locations where the soil samples were taken, when the path shown in FIG. 1 was followed. The path would be marked in some suitable manner as stated, (such as a furrow, end stakes or navigation aids) so that the vehicle 11B could follow along the previous path of the soil sampler, at each location of a soil sample. The program for applying indicated at 242 would be based upon the analysis of the soil, and can be preprogrammed into the memory for the computer 240 so that at a particular location a blend of materials from three different bins (Nitrogen, Phosphorus and Potassium) located at 244, 246 and 248 would be utilized. The bins would each have a gate or metering delivery mechanism 244A, 246A, and 248A. The gates are operated by known actuators at 244B, 246B, and 248B, respectively.

The amount of discharged material from the gate or delivery mechanism 244A, 246A, and 248A is sensed by a rate sensor of conventional design, indicated at 244C, 246C, and 248C, respectively. This information is fed back into the on-board computer at 240, and compared with the program of applying at each individual location as sensed by the distance sensor 241, and the actuators are then adjusted so that the appropriate rate is being delivered to the fertilizer spreader of nitrogen, phosphorus, and potassium, which are the bins 244, 246, and 248, respectively. The on-board adjustment can also be made in response to navigational inputs for location of a fertilizer spreader or seeder in the vehicle 11B. The path again can be followed precisely so that each grid is provided with the needed input of fertilizer or seed.

Thus, the automated soil sampler permits rapid sampling at close locations. By separately packaging and testing the soil samples, and using that information for fertilizing at each sample, and then following the same paths with the fertilizer applicator, or seeder, herbicide application, or site specific application are possible.

Developing A Program Of Application

FIGS. 18–22, and the description below, more specifically set out a system according to the present invention by which a program is developed for controlling application of material to a field of interest. In the following discussion, unless otherwise noted, coefficients, modification factors or data points are all either obtained from hydroponic or inert environment experiments, or through analysis techniques described herein, or available data bases (either commercially available or built based on experimental results), as appropriate.

Figure 18:
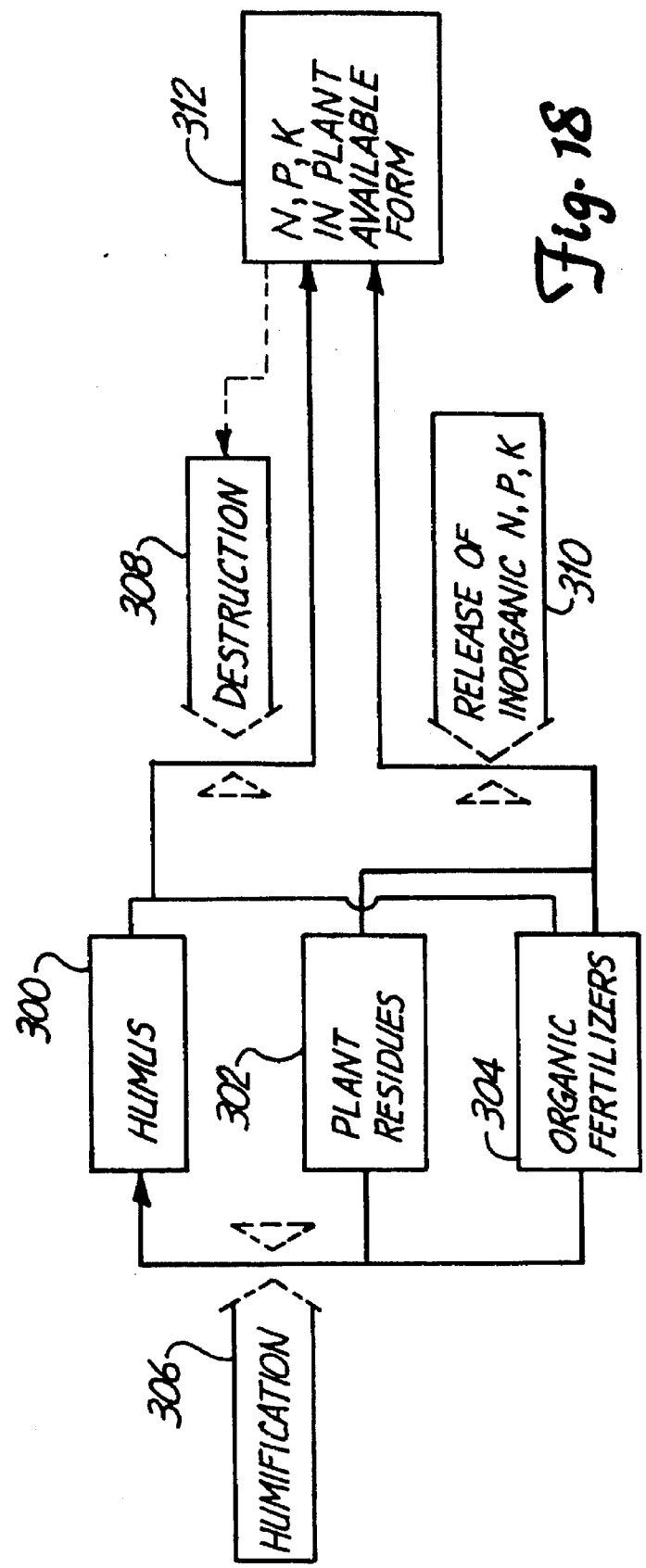
FIG. 18 is a schematic representation of an organic matter submodel used in obtaining organic matter application rate parameters according to the present invention.

FIG. 18 shows a schematic representation of an organic submodel used to determine field requirements for organic fertilizers according to the present invention. The system according to the present invention determines the natural balance of humus for the present agricultural year (from autumn to autumn). The balance of humus is determined as the humification of fresh organic matter minus any decomposition of humus which occurs. The fresh organic matter which provides humus is primarily that from plant residues 302 of a forerunner crop in the field of interest, and organic fertilizers 304 applied to the field of interest in FIG. 18. These two items undergo humification 306 to produce humus 300. The annual natural humus balance is calculated according to the following equation:

$$\text{Humus Balance} = \text{Compos} - \text{Decomp}; \quad \text{Equation 1}$$

where Compos is the mass of humus which will be formed within a year out of the plant residues of the forerunner crop; and Decomp is the humus decomposition for the present year. The humification value Compos is calculated depending on the type and yield of the forerunner crop, the type of soil in the field of interest, and the heat and moisture conditions. Compos is further defined as:

$$\text{Compos} = \text{Resid} * \text{Pcult (2,11)} * \text{Hum\%} * \text{Bio}; \quad \text{Equation 2}$$

where Resid is the initial mass of plant residues;

Pcult (2,11) is a data array representing the amendment to the coefficient of humification of the plant residues based on the type of forerunner crop;

Hum% is the humification of the plant residues as a percent of the initial mass, modified by a variant due to heat and moisture conditions; and Bio is a factor used to amend the humification percent based on differences in the speed of humification of the organic fertilizers and plant residues, which is itself dependent on the biological activity of the specified type of soil found in the field of interest.

The initial mass of the plant residues of the forerunner crop is determined from the following equation:

$$\text{Equation 3}$$
$$\text{Resid} = \text{Pcult (2, 5)} * YF^2 + \text{Pcult (2, 6)} * YF + \text{Pcult (2,7)};$$

where YF is the yield of the forerunner crop; and

Pcult (2,5), Pcult (2,6), and Pcult (2,7) are coefficient vectors which are dependent on the type of forerunner crop and which are used to modify the yield factor in the above equation.

The quantity of humus which will be decomposed within a year (designated as Decomp and indicated by block 308 in FIG. 18) is calculated from the following formula:

$$\text{Decomp} = \text{Humus} * \text{Psoil (4)} * \text{Pcult (1, 16)} * \text{PTW (ITERMW, 1)}/100; \quad \text{Equation 4}$$

where Humus is the initial amount of humus from the previous year;

PTW (ITERMW, 1) is the element of a data array associated with a selected variant based on heat and moisture conditions and defines the humus decomposition for a year as a percent of the initial value of humus;

Psoil (4) is an amendment to the speed of humus decomposition based on the biological activity of the specified soil type in the field of interest; and Psoil (1, 16) is an amendment to the speed of the humus decomposition, based on the soil treatment method inherent for the present crop in the field of interest. The variables used in the above equation are all determined preferably by experiment under controlled environment conditions wherein the environment and soil types are controlled and are preferably modeled after those found in the field of interest.

Based on these calculations, if the humus balance in equation 1 is positive, then organic fertilizers are not required for the field of interest. However, if the humus balance is negative, the quantity of the organic fertilizer, referred to below as Comp (5), should be applied so that the humification provided by the organic fertilizer compensates for any reduction of the humus store. Comp (5) is thus determined as follows:

$$\text{Comp (5)} = (-\text{humus balance} + \text{psoil (13)}) * Hthi * dens * 1000 / PTW\ (ITERMW,\ 2) * Psoil\ (17) * Porg\ (13)/100;$$

where Psoil (13) is a planned annual increase of the humus store, in percent, and planned by the crop manager;

Hthi is the plow level thickness, in centimeters, in the field of interest;

dens is soil density in grams per cubic centimeter;

PTW (ITERMW, 2) is the percent of the organic fertilizer's humificating according to the variant with heat and moisture, ITERMW; and Porg (13) is the amendment to the speed of humification of the organic fertilizers based on the type of fertilizer.

Therefore, the humus balance is determined and used to control field treatment.

Field Requirements For Nitrogen, Phosphorus and Potassium (NPK)

Figure 19:
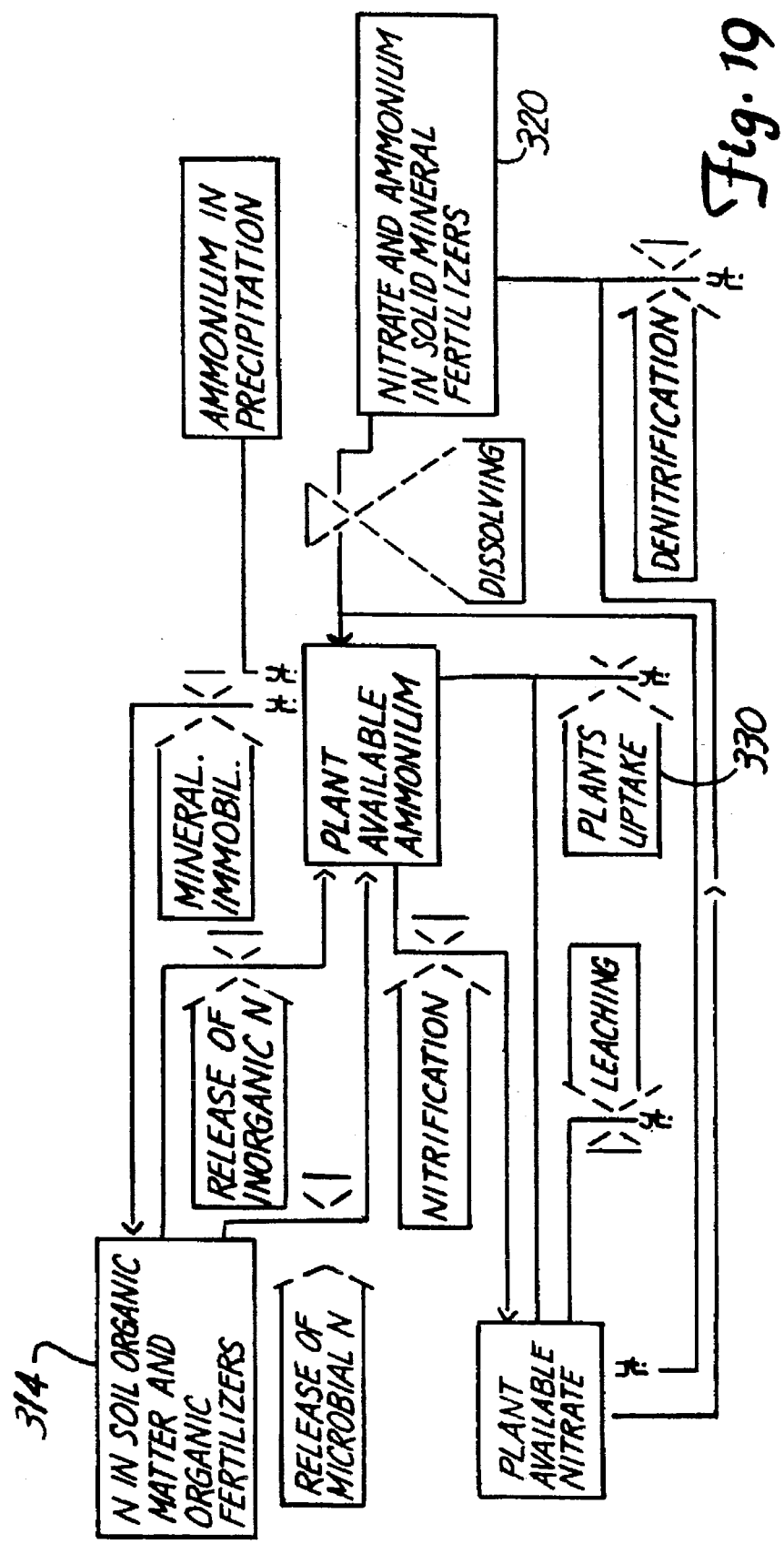
FIG. 19 is a schematic representation of a nitrogen submodel used in obtaining nitrogen application rate parameters according to the present invention.
Figure 20:
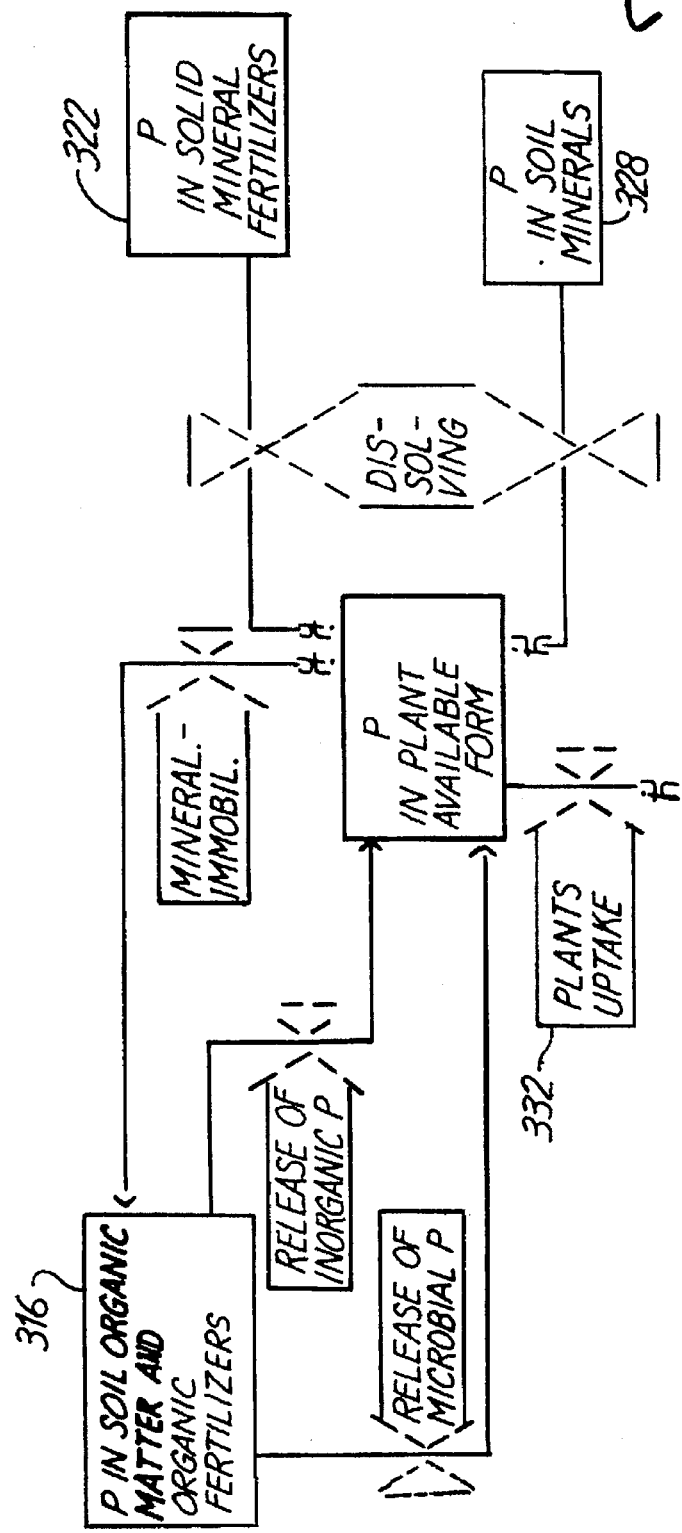
FIG. 20 is a schematic representation of a phosphorus submodel used in obtaining phosphorous application rate parameters according to the present invention.
Figure 21:
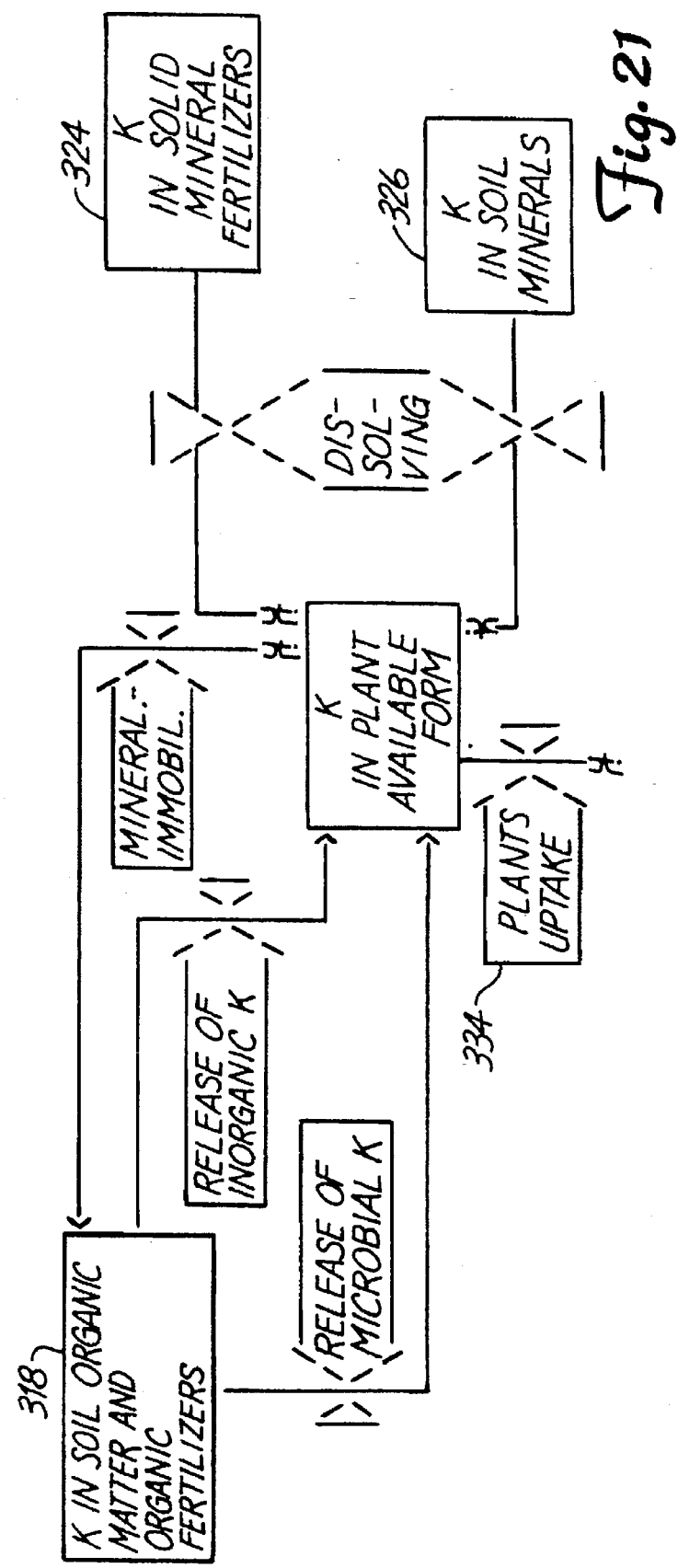
FIG. 21 is a schematic representation of a potassium submodel used in obtaining potassium application rate parameters according to the present invention.

FIG. 18 also shows that, in the organic matter submodel, plant residues and organic fertilizers can release inorganic NPK which is available to the plants. This is indicated by blocks 310 and 312 in FIG. 18. The principle guiding computation of field requirements for NPK is the need to compensate with mineral fertilizers for a shortage of the nutrition elements (NPK) in the soil. The shortage is determined by taking the plant uptake for the various nutrition elements and subtracting the main income items for the various nutrition elements. The main income items for the various nutrition elements are shown in FIGS. 19–21 and include release of NPK from the plant residues of the forerunning crop and organic fertilizers (of both the current year and previous years) (blocks 314, 316 and 318), mineral fertilizers applied in the current year (blocks 320, 322 and 324), and post-action of the phosphorous and potassium fertilizer which has been applied in previous years (blocks 326 and 328).

The difference between the plant's uptake (blocks 330, 332 and 334) and these items yields the initial doses for application of NPK. These initial doses are corrected, depending on the sign and value of the difference between the actual content of the NPK and the soil and the optimum level for any given zone across the field of interest.

If the actual content of NPK is considerably lower than the optimum content, the dose of fertilizer application is preferably increased so that not only does it compensate for current usage, but it also increases the contents of the nutrition elements in the soil. If the actual content is higher than optimum, the application is reduced in order to prevent toxicity from developing in the soil, and in order to prevent any excessive expenditures incurred during the application.

The requirement levels for nitrogen fertilizer are also corrected for nitrogen provided by humus reserve in the field. The requirement levels for phosphorous and potassium are corrected based on the pH of the soil. These correction factors are taken from reference data bases. In addition, the entire computation is also weighted by the heat and moisture conditions of previous seasons.

It should also be noted that the total requirements of the field calculated by the present invention must be tempered to remain in compliance with any restrictions which are valid in appropriate zones. Such correction factors are presented in reference data bases.

NPK Uptake By Plants

Depending on the kind of crop cultivated, and the yield planned, the present system determines the expected usage of the NPK by the plants. The present system takes into consideration both the alimentation of the nutrition elements with the main production and by-production, and the content of the nutrition elements in future plant residues for the particular crop being grown.

For nitrogen, the uptake level is defined as follows:

$$Uptake_N = yield * Pcult\ (1, 2) + residl * Pcult\ (1, 8).$$

For phosphorous, the uptake level is determined as follows:

$$Uptake_P = yield * Pcult\ (1, 3) + residl * Pcult\ (1, 9).$$

For potassium, the uptake level is computed as follows:

$$Uptake_K = yield * Pcult\ (1, 4) + residl * Pcult\ (1, 10).$$

In the above three equations, the yield term is the planned yield for the current year;

Pcult (1, 2), Pcult (1, 3), Pcult (1, 4) are the amount of N, P and K, respectively, per unit of host production, accounting for by-production.

Residl is the quantity of the future plant residues of the crop currently grown.

Pcult (1, 8), Pcult (1, 9), Pcult (1, 10) are the content of N, P and K, respectively, in the future pant residues.

The quantity of the future plant residues is calculated depending on the planned yield, in a similar fashion to the plant residues of the forerunner, as follows:

$$Residl = Pcult\ (1, 5) * (yield/10)^2 + Pcult\ (1, 6) * yield/10 + Pcult\ (1, 7).$$

A portion of the NPK uptake by the plants is compensated because of the natural processes not connected with the fertilizers or forerunners. The portion of NPK which is subject to compensation is calculated with the help of correction factors as follows:

$$Uptake_N = Uptake_N * Pcult\ (1, 17);$$

$$Uptake_P = Uptake_P * Pcult\ (1, 18);\ and$$

$$Uptake_K = Uptake_K * Pcult\ (1, 19)$$

where the factors Pcult (1, 17), Pcult (1, 18) and Pcult (1, 19) are correction factors determined based on controlled environment experiments, or which are taken from generally available data bases.

Mineralization of Nitrogen and Phosphorous and Release of Potassium From Plant Residues An additional source of nitrogen, phosphorous and potassium is from mineralization, and release from plant residues. These items are determined as follows:

For nitrogen:

$$Comp\ (8) = Resid * Pcult\ (2, 8) * Psoil\ (18);$$

For phosphorus:

$$Comp\ (9) = Resid * Pcult\ (2, 9) * Psoil\ (19);\ and$$

For potassium:

$$Comp\ (10) = Resid * Pcult\ (2, 10) * Psoil\ (20).$$

In the above equations, Resid is the mass of the plant residues;

Pcult (2, 8), Pcult (2, 9) and Pcult (2, 10) are the contents of N, P and K, respectively, in the absolutely dry mass of the plant residues; and Psoil (18), Psoil (19), and Psoil (20) are the portion of N, P and K of the plant residues having entered the soil. These items are determined through experimentation, and depend on the type of soil in the field of interest.

Mineralization of Nitrogen and Phosphorous, and the Release of Potassium from the Organic Fertilizers Applied for the Present Crop Another source of NPK is through mineralization, and release of these elements by the organic fertilizers applied to the crop. These items are determined as follows:

For nitrogen:

$$comp\ (24) = doz\ 1 * Norg\ 1 * (1 - Porg\ (5)\ Porg\ (12)) * Porg\ (14);$$

For phosphorous:

$$comp\ (25) = doz\ 1 * Porg\ 1 * Porg\ (15);\ and$$

For Potassium:

$$comp\ (26) = doz\ 1 * Korg\ 1 * Porg\ (16).$$

In the above equations, doz 1 is the dose of the organic fertilizer applied for the main culture;

Norg, Porg, Korg are the portions, respectively, of nitrogen, phosphorous and potassium in the organic fertilizer;

Porg (5) is the portion of mineral nitrogen in the organic fertilizer;

Porg (12) is the portion of mineral nitrogen being lost during the application;

Porg (14), Porg (15), and Porg (16) are the empirical coefficients of the action of nitrogen, phosphorous and potassium found in the organic fertilizer, which occurred during the year of application.

Mineralization of Nitrogen and Phosphorous and Release of Potassium from the Organic Fertilizers Applied in Past Years Another source of NPK is actions which have been taken, or which have occurred, in past years. For instance, nitrogen and phosphorous mineralization which occurred in past years contributes to the NP levels in the current year. Further, release of potassium from organic fertilizers applied in past years also contributes to the K level for the current year. These items can be determined as follows:

For nitrogen:

$$comp(19) = doz2 * Norg2 * pN2 + doz3 * Norg3 * pN3 + doz4 * Norg4 * pN4 + doz5 * Norg5 * pN5.$$

For phosphorous:

$$comp(20) = doz2 * Porg2 * pP2 + doz3 * Porg3 * pP3 + doz4 * Porg4 * pP4 + doz5 * Porg5 * pP5.$$

For potassium:

$$comp(21) = (doz2 * Korg2 * pK2 + doz3 * Korg3 * pK2 + doz4 * Korg4 * pK4 + doz5 * Korg5 * pK5.$$

where doz2, doz3, doz4, doz5 are the doses of the organic fertilizers applied 2, 3, 4 and 5 years ago, respectively;

Norg2, Norg3, Norg4, Norg5 are the contents of nitrogen in the organic fertilizers applied 2, 3, 4 and years ago;

Porg2, Porg3, Porg4, Porg5, Korg2, Korg3, Korg4, Korg5 are the contents of phosphorous and potassium in the organic fertilizers previously applied;

pN2, pN3, pN4, pN5 is the post-action of nitrogen of the organic fertilizers applied 2, 3, 4, and years ago; and pP2, pP3, pP4, pP5, pK2, pK3, pK4, pK5 is the post-action for phosphorous and potassium.

Receipt of Nitrogen, Phosphorus and Potassium from the Mineral Fertilizers Applied Within the Current Year Of course, another source of NPK for the current year is from mineral fertilizers applied within the current year. These items can be accounted for as follows:

For nitrogen:

$$comp(27) = md(17) * (1 - ptw(itermw, 4));$$

For Phosphorous:

$$comp(28) = md(18) * (1 - ptw(itermw, 5));$$

For Potassium:

$$comp(29) = md(19) * (1 - ptw(itermw, 6)).$$

Where md(17), md(18), md(19) are the doses of N, P and K, respectively; and ptw(itermw, 4), ptw(itermw, 5), ptw(itermw, 6) are the losses of the applied nitrogen, phosphorous and potassium, respectively, depending on the variant based on heat and moisture (itermw), mentioned above.

Receipt of Phosphorous from the Mineral Fertilizers Applied for the Previous Four Years Yet another source of phosphorous is from mineral fertilizers which have been applied over the past four years. This contribution of phosphorous can be determined as follows:

$$comp(17) = red(50) * psoil(21) + red(51) * 0.15 + red(52) * 0.1 + md(53) * 0.05$$

where md(50), md(51), md(52), and md(53) are the doses of phosphorous applied 1, 2, 3 and 4 years ago, respectively; and psoil(21) is the coefficient of the postaction of the phosphorous fertilizers applied for the forerunner crop in the field of interest.

Receipt of Potassium from the Mineral Fertilizers Applied Last Year

The mineral fertilizers applied in the first adjacent previous year also contribute to the potassium level in the field of interest. This item of contribution can be determined as follows:

$$comp(18) = md(74) * psoil(22)$$

where md(74) is the dose of the mineral fertilizers applied for the forerunner; and psoil(22) is the coefficient of post-action of the potassium fertilizers applied for the forerunner.

Annual Balance of Nitrogen, Phosphorous and Potassium

From the above subsections, the annual balance of nitrogen, phosphorous and potassium can be determined as follows:

For nitrogen:

$$comp(30) = comp(8) + comp(19) + comp(24) + comp(27) - comp(14);$$

For phosphorous:

$$comp(31) = comp(9) + comp(17) + comp(20) + comp(26) + comp(28) - comp(15);$$

For potassium:

$$comp(32) = comp(10) + comp(18) + comp(21) + comp(26) + comp(29) - comp(16).$$

Therefore, the total balance of NPK in the field of interest is known with a high degree of accuracy.

Computation of Total Requirement for Mineral Fertilizers

Once having computed the annual balance of NPK in the field of interest, the present system assists the crop manager in determining the amount of mineral fertilizers which should be applied to the field in order to bring the NPK levels to desired or optimum levels, as follows:

For nitrogen:

$$fN=(comp(30)+(NO-Nopt * Ns)/psoil (5) * pHUM * 100/(100-ptw(itermw, 4));$$

For phosphorous:

$$fP=(comp(31)+(PO-Popt * Ps)/psoil (6) * pHP * 100/(100-ptw(itermw, 5)); \text{ and}$$

For potassium:

$$fK=(comp(32)+(KO-Kopt * Ks)/psoil (7) * pHk * 100/(100-ptw(itermw, 6)).$$

Where NO, PO, KO are the start NPK reserves in the plow layer;

Nort, Port, Kort are the amounts of NPK in the plow layer being optimum for the given crop;

Ns, Ps, Ks are the correction factors for the optimum amounts of NPK in the plow layer;

psoil(5), psoil(6), psoil(7) are the expected term of restoration of the NPK store to the optimum levels, in years;

PHUM is the correction to the N dose taking into account the soil acidity;

PHP, PHK are the corrections to the P and K doses taking into account the soil acidity;

ptw(itermw, 4), ptw(itermw, 5), ptw(itermw, 6) are the percentages of the NPK losses from the mineral fertilizers at the variant of heat and moisture conditions, itermw.

Field Requirements for Other Nutrients

All soils in the field of interest may be subdivided into categories including mineral, organic material, or a mixture of the two according to the content of the organic substance in the soil. The total capacity of the soil to hold nutrients is considered separately, for each type of nutrient. The soil capacity is based on the following factors:

X1=percent of particles with size<10 μm in sample dry mass;

X2=percent of particles with size 10–100 μm;

X3=percent of humus in soil sample;

X4=percent of alkali-soluble fraction of humus;

X5=percent of sesquioxides;

X6=percent of carbonates; and

X7=soil acidity (pH).

Each of these factors is determinable by the sample tester set out in co-pending application Ser. No. 08/286,768 and causes the soil to have a different binding selectivity relative to concrete ions. Every plant species, or crop type, corresponds to a set of optimal ion concentrations for the given soil solution. Such biological optimums are preferably determined by hydroponic techniques or through the use of a controlled, inert growing environment. Once these optimums are determined for the particular field of interest, the crop requirement for any particular ion is expressed by the following formula:

$$\tau(i)=0(i)+\Gamma1(i) * X1+\Gamma2(i) * X2+\ldots+\Gamma7(i) * X7-(i),$$

where $\tau(i)$ is amount of i-th ion needed to reach biological optimum;

0(i) is optimum concentration of i-th ion in the soil;

$\Gamma1(i), \Gamma2(i), \ldots, \Gamma7(i)$ are coefficients determining separate binding of i-th ion owing to factors $X1, \ldots, X7$;

(i) is contents of i-th ion in the given soil sample being determined by extraction 1N HCl.

Thus, these items are preferably determined and used in optimizing a treatment program for the field of interest.

Irrigation Management and Yield Prediction

FIG. 23 is a schematic-type diagram illustrating the model according to the present invention for phenological phases, and soil moisture dynamics. The present methodology is suitable for treating a wide scope of agricultural crops and agroecological conditions.

Several phenological phases (phenophases) are determined for each type of crop. For the following discussion, it is assumed that the day when the next, i-th phenophase begins is denoted as N(i). The phases are determined based on the following logical expression:

$$Ni\Sigma(t(j)-5)>T(i, k) \ j=N(i-1)$$

where N(i−1) is the number of the day when predecessor (i−1)th phenophase came for the given crop;

t(j) is the ambient air temperature on the j-th day;

k is a symbolic number of the culture;

T(i, k) is the total amount of effective temperature degrees which must accumulate since the first day of the previous phenophase of the k-th crop.

The calculation for each phenophase is conducted beginning at the sowing day for spring sowed crops or revegetation for winter and perennial crops. The last phenophase is crop harvesting (i.e., when the crops are technically mature).

Soil Moisture Dynamics

The present invention also utilizes a model for determining seasonal dynamics of moisture in the root-habitant layer. The moisture equation is given as follows:

$$W(j)=W(j-1)-E(j)+P(j)+Q(j)+M(j)-F(j)$$

where j is number of the day;

W(j) is moisture stocks of a root-habitant layer of the soil at the end of the j-th day, in mm;

E(j) is evapotranspiration (total evaporation) as of the j-th day;

P(j) is the amount of rainfall as of the j-th day into the root-habitant soil layer;

G(j) is the amount of ground water coming into the root-habitant soil layer as of the j-th day;

M(j) is the daily irrigation rate, if any; and

F(j) is filtration out of the root-habitant layer area.

The evapotranspiration calculation is carried out using the following formula:

$$E(j)=bk[S(j)] * D(j) * [g1+g2* V(j)] * [W(j-1)-WP]/(g3* WC-WP)$$

where bk[S(j)] is a bioclimatic factor of the k-th crop on the j-th day, which is dependent on an accumulation of the total amount of the ambient air temperatures through the j-th day;

S(j) is the accumulated amount of average daily temperatures of the ambient air over the period from the date of seedings (for spring crops) or revegetation (for winter and perennial crops) up to the j-th day;

D(j) is the average annual deficiency of air humidity on the j-th day;

V(j) is the maximum wind speed on the j-th day;

WC is the water capacity of the root-habitant soil layer;

WP is the soil moisture wilting point;

g1, g2, g3 are constants which are determined through an initial identification procedure similar to the procedure used in refining MPK uptake coefficients discussed below.

Air deficiency is calculated using the Magnus formula:

$$D(j)=6.12 * [1-0.01 * Q(j) * \exp\{17.1 * t(j)/[235+t(j)]\}$$

where Q(j) is average daily RH (relative (air) humidity) on the j-th day, in percent;

t(j) is the average daily air temperature on the j-th day in deg. C.

The bk[S(j)] is represented by an exponential polynomial as follows:

$$bk = \exp[A0+A1* S(j)+A2*S(j)^2+A3* S(j)^3+A4* S(j)^4]$$

where A0, A1, A2, A3 and A4 are experimentally determined constants.

When calculating a value of P(j), a presumption is adopted that the root-habitant layer receives moisture only from rainfalls in excess of 5 mm, i.e.:

ti $P(j)=0$, $P0(j)<=5$, $P(j)=P0(j)-5$, $P0(j)>5$ where P0(j) is the daily rainfall rate, in mm.

The amount of ground waters coming into the root-habitant soil layer is calculated using the formula:

$$G(j)=E0(j) * \exp(-m * h)$$

where

E0(j) is potential evaporation during the j-th day, in mm;

m is a factor which is dependent on mechanical composition of the soil h is the depth of the ground water level.

The potential evaporation is calculated as:

$$E0(j)=b1* D(j) ** b2* t(j)$$

where b1 and b2 are experimentally determined constants.

The daily value of filtration F(j) at W<=WC is assumed to equal zero. At W>WC, filtration is calculated according to the following formula:

$$F(j)=kf * (W(j)-WC)/2 * Ht$$

where kf is a factor of filtration related to mechanical composition and volume mass of the soil; and Ht is the thickness of the estimated soil layer.

Crop Yield Model

The present invention also utilizes a model in determining crop yield. Calculation of the crop yield is based on the dynamics of heat and moisture provision over the vegetation period, and the average field quality index. This yield model is performed using the following formula:

$$Y = R1 * B0 * \sum_{j=N1}^{Nk} \{f1[t(j)] * f2[W(j)]\},$$

where R1 is a constant parameter (potential crop daily productivity);

B0 is an average value of the field quality index dependent on field characteristics;

N1 is the number of the day of seeding (for spring crops) or revegetation (for winter and perennial crops);

Nk is the predicted number of the day of crop harvesting;

f1[t(j)] is a function of sensitivity of differential productivity on the j-th day to air temperature;

f2[W(j)] is a function of sensitivity of differential productivity on the j-th day to soil moisture.

Functions f1 and f2 appeared as normal relations:

$$f1=\exp\{-[t(j)-R2^2]/(2 * R3^2)\}$$

where R2 is the optimal temperature;

R3 is a factor of sensitivity of differential productivity to temperature.

$$f2 =\exp\{-[q(j)-R4^2]/ 2 * R5^2\}$$

where R5 is a sensitivity factor of the differential productivity to soil moisture;

q(j) is the normalized productive moisture stock on the j-th day;

$$q(j)=(W(j)-WP)/(WC-WP)$$

R4 is an optimal normalized productive moisture stock.

The effect of soil fertility, seed grade and state of sowings of winter and perennial crops after hibernation is evaluated by means of the field bonitet (or quality index). The B0 value is calculated using the following formula:

$$B0 = \left\{ \sum_{i=1}^{n} Bi[Z(i)] \right\} /n$$

where n is a number of factors accounted for through bonitet (for perennial grasses and winter crops n=8, for others n=7);

Bi is a specific bonitet by i-th factor;

Z(i) is a value of the i-th factor for the given field of interest.

The two main types of Bi[Z(i)] relations are adopted in the model. The relation of the first type is used in the cases when growing factor value within technological permissible limits leads to crop yield:

$$Bi=Z(i)/Ze(i)$$

where Ze(i) is a reference value of the i-th factor.

The relation of the second type is used in the cases when there is an optimal value of the growing factor and when any deviation from this value (made in either a positive or negative direction) causes the yield to be lowered.

$$Bi=\{Z0(i)-abs[Z0(i)-Z(i)]\}/Z0(i))$$

where Z0(i) is an optimal value of the i-th factor.

The yield factors accounted for through bonitet are:

1) percentage of physical clay in the volume of dry soil;
2) humus content in the soil;
3) the content of plant available nitrogen in the root-habitant soil layer;
4) the content of plant available phosphorus in the root-habitant soil layer;
5) exchangeable potassium content in the root-habitant soil layer;
6) pH of the soil solution;
7) grade of the seeds used for seeding;
8) the crop conditions after hibernation.

Thus, crop yield is determinable with the present system.

Enhanced System For A Detailed Analysis Of Soil Fertility Dynamics

The essence of the system includes a simulation of the dynamics of the main variables describing the state of the soil fertility (state variables) in the field of interest. Soil fertility in this system is based substantially on the main forms of nitrogen, phosphorus and potassium in the soil layer, where the activity of the plant roots is significant. All the variables are expressed in kilograms per hectare and are related to some calculated soil layer. While adapting the present system to the specific soils, the soil layer thickness is preferably selected so that 80–90% of the total root mass in the phase of the plant's full development and substantially all the humus store, are within this layer.

The submodel of nitrogen transformations set out in FIG. 19 describe the daily balance and resulting seasonal dynamics of nitrate and ammonium in the form of plant available ions and also in the form of applied organic and mineral fertilizers. The phosphorus and potassium submodels (FIGS. 20 and 21) also show the balance and dynamics of these nutrition elements in plant available form and in the form of applied organic and mineral fertilizers. The organic matter submodel (FIG. 18) shows transformation of humus, plant residues and organic fertilizers.

The intensity of N, P, K and organic matter transformations depends on soil moisture and temperature. Simple regression equations are developed for temperature dynamics in upper and lower parts of the soil layer. Daily balance and dynamics of soil moisture are provided by the particular submodel shown in FIG. 22.

The model is presented by 11 coupled equations in finite differences, the solution of which gives the values of all the state variables for each day of the calculated period. The calculated period lasts from the date of the harvesting of the predecessor crop to the date of the harvesting of the basic cultivated crop.

The basis of the model is the biological conception of the mutual transformation of the organic and mineral forms of the macronutrients. As a result of the decomposition of humus, organic fertilizers and vegetable residues of the predecessor, accompanied with the mineralization of the NPK, the funds of the ammonium, nitrogen, phosphorus and potassium available to the plants are replenished. The value of this replenishment is preferably calculated depending on the content of the NPK in the organic compounds and relative rates of the decomposition of each substrate. Moreover, the potassium of the vegetable residues and NPK of the organic fertilizers contained in mineral form is added transites to the funds available to plants. The nitrate fund is formed as a result of the nitrification of the ammonium form of nitrogen. A portion of the decomposing substance of the organic fertilizers and vegetable residues is condensed replenishing the humus reserve. The humification intensity depends of the sort of predecessor and organic fertilizers.

The content of the available forms of the NPK increases also due to the application of the liquid mineral fertilizers and dissolution of the solid ones with the rate dependent on the particular sort of fertilizer. Moreover, phosphorous and potassium enter the soil solution during the dissolution of the minerals. Also, a small quantity of the nitrates, ammonium and potassium enter the soil from atmospheric precipitation.

The expenditure items for the funds of the available nutrients are composed from the bearing-out by plants, immobilization by the microorganisms washing out the mobile forms with the moisture filtration and denitrification. While calculating the bearing out, the expected yield, duration of vegetation and dynamics of the water consumption of the cultivated crop. The value of the mineral compound immobilization should be calculated depending on the NPK content in the decomposing organic substance and critical C/N, C/P and C/K relationship for the main population of the soil microbes. The bearing out of the nutrients is proportional to their concentrations in the soil solution and filtration value from the root-habitant soil layer. The denitrification rate is determined by the presence of nitrate.

The life activity of the soil microbes is accompanied by fixing certain quantities of nitrogen, phosphorous and potassium. After the microbes die out, a considerable portion of these biologically fixed elements is released and transforms to a form available to plants.

Besides the above-mentioned factors, the intensity of all the described processes is determined by the temperature and moisture of the soil as well. The specific form of this influence is individual for each process.

The basic mathematic tool of the model is presented by the kinetic of the first and second order equations. The rates of all their processes except for the dissolution are to be calculated from formulae of the following form:

$$Z(t) = k(t) * Y(t)$$

where t is the time in days;
Z is the rate in kg/ha * day;
k is the relative rate of the process depending on the diverse factors; and
Y is the process substrate in kg/ha.

For the description of the fertilizer and mineral dissolution processes, the following formula is adopted:

$$Z(t) = k(t) * Y(t) * (C - X(t))$$

where Y is the content of the soluble substance (fertilizers, minerals); and
C and X are the saturating and actual concentration of the dissolution product in the soil solution, respectively.

The relative rate, k(t), of any microbiological process includes the functions of the soil temperature and moisture f(t) and g(W) as the factors. These functions have the same exponential form:

$$f(T) = \exp(-(T-r1)^2/(2*r2^2)) \quad g(W) = \exp(-(W-p1)^2/(2*p2^2))$$

where the parameters r1, r2, p1 and p2 have their own values for each process. The graph of these functions has the bell-like shape of a normal distribution curve. At the optimum temperature and moisture, the functions have the maximum value equal to 1. In the case of considerable deviation from the optimum, the functions asymptotically approach zero. The parameters r1 and p1 describe the optimum values of the temperature and moisture; and r2 and p2 determine the curve slope.

The dependence of the dissolution rate on the soil moisture is taken into account through the concentration of the dissolution product in the soil solution, which depends directly on the moisture. The temperature factor in the relative rate of the dissolution is calculated from the Arrhenius formula:

$$a(T) = \exp(-E/t)$$

where E is the energy parameter of the process.

Yearly Refinement of NPK Plant Uptake Coefficients

Site specific yield data and NPK content in soil samples taken before sowing and after harvesting are used to refine plant uptake coefficients denoted as pcult (1, 2), pcult (1, 3), pcult (1, 4) above. The new uptake coefficient is calculated from the following formula:

$$UC = (A2 - A1 + RA - RL - Kr * Yr) / (Yh + Yb)$$

where UC is the new uptake coefficient for a particular nutrient N, P or K;

A2 and A1 are the initial (before sowing) and final (after harvesting) amounts of particular nutrient in the soil in plant available form;

RA is the total amount of nutrient applied for the season;

RL is the total nutrient loss calculated using the above-described dynamic model;

Kr is the content of the nutrient in the dry mass of plant residues of the grown crop denoted as pcult (2, 8), pcult (2, 9), pcult (2,10) described above;

Yr is the dry mass of plant residues of the grown crop calculated using site specific yield and parameters pcult (1, 5), pcult (1, 6) and pcult (1, 7) described above;

Yh and Yb are respectively the site specific host production and by-production.

The ultimate values of UC are averaged over site specific values and replace old UC parameters in the reference data base.

Yearly Refinement of Yield Model Parameters

Yield monitoring data in addition to field and site specific information is used to correct yield model parameters R1, . . . , R5 discussed above. The yield is considered a function F (R1, .R5) and its values are obtained from the yield model running at any suitable parameters values and taking into account all needed data such as field characteristics. The standard software finds optimal values R1, . . . , R5 minimizing the following goal function:

$$G = \Sigma [F(R1, \ldots, R5, i) - Y(i)]^2$$

where i is the site number or geographical identifier within the field;

Y(i) is yield in i-th site; and

Σ denotes summation over all sites within the field.

Optimal values R1, . . . . R5 replace old values in the reference data base.

Estimation of the Optimal Values of Biogenic Elements

The reliable multidimensional dependencies of the production quality factors on the dose and relationship of the biogenic elements in the nutritional substrate (topographic characteristics of the production process) may be obtained with the help of the multifactor field experiment.

In order to process the data of the multifactor experiment, the Nelder-Mid simplex method of non-linear approximation has been used. The following analytical expression was selected as a basic function approximating the dependence of the morphometric and biochemical factors (Y) on the relationship of the macroelements in the nutritional medium:

$$Y = P(O) * \prod_{k=1}^{n} [X(k)^{P(k)}]$$

where n is the number of optimized elements;

P(O) and P(k) are the parameters of approximation;

the symbol $$\prod_{k=1}^{n}$$

designates the multiplication of the contents in the brackets n times; and

X(k) is the portion of the k-th element in the nutritional substrate to be calculated from the formula:

$$X(k) = C(k) / \sum_{i=1}^{n} C(i)$$

where C(k) is available macroelements for the plant concentration of the element being optimized in the substrate.

The proposed mathematical expression simulates satisfactorily the dependence of some morphological and biochemical factors on the relationship of the macroelements. Especially, as the experiment shows, it is true for those factors which correlate with the increase of the biomass (content of pigments, vitamins, plant length at the initial stage of growth, grain yield, etc.).

The content of the approximation process consists in the minimization of the contradiction between the theoretical and experimental values of the characteristic factors at the concentration values specified by the scheme of experiment or determined from the analysis of the heterogenic soil areas. The approximation method developed herein achieves great flexibility and reliability.

The calculated approximation parameters P(i) allow to ascertain immediately the optimum relationship of elements in the nutrition substrate for the studied factor. In this case the optimum portion of the k-th element (X(k)opt) is calculated from the formula:

$$X(k)opt = P(k) / \sum_{i=1}^{n} P(i)$$

The convenient form of mapping the joint influence of the three elements on the parameters of the production process is triangle matrix. The present system projects the topographic characteristics (optimum relationship of the three selected elements, contours of zones with the specified range of values of the production parameters) on the matrix field.

The biological optimum of crops is determined by means of the multifactor laboratory-and-field experiment in the course of a number of years. The drastic reduction of the volume of work required when determining the biological optimum of crops is possible if the present method is used for the computations on the basis of the high-resolution field productivity (yield map) and the agrochemical factors obtained as a result of yield monitoring and soil samples analysis.

The present invention utilizes data bases to obtain many of the coefficients and data required in the above-calculations. For instance, the present invention accesses data bases which hold forerunner crop information including crop types previously grown in the field of interest, and yield data indicative of yield of those crops. The present invention also accesses data bases related to soil information for the field of interest. These data bases include soil type (i.e., the mechanical composition of the soil), depth of the plow horizon in the field of interest, soil density, and mineral nitrogen in underground soil layers. Further, the present invention accesses data bases containing current crop information, such as crop type and planned yield of the current crop.

The present system also keeps and accesses data bases containing organic and mineral fertilizer information. Such information includes the types and levels of organic and mineral fertilizer applied to crops for the previous years, NPK in presowing and sowing applications, phosphorus applied for the previous years, and potassium applied to the forerunner crop.

Although the present invention has been described with reference to preferred embodiments, workers skilled in the art will recognize that changes may be made in form and detail without departing from the spirit and scope of the invention.

What is claimed is:

1. A method of treating a field of interest, comprising:
   taking a plurality of soil samples from different geographic locations in the field of interest;
   determining, for each of the plurality of samples, a geographic identifier identifying the geographic location from which the sample was taken;
   analyzing the samples to determine a plurality of soil characteristics indicative of soil condition;
   accessing data from a data base to obtain field characteristics corresponding to the field of interest, the field characteristics being indicative of current and historical information corresponding to the field of interest, wherein accessing data from a data base includes accessing humus information indicative of a forerunner crop in the field of interest;
   determining a program for applying material to the field of interest based on the soil characteristics, the geographic identifiers and the field characteristics, wherein determining a program comprises determining a balance of humus in the field of interest based on plant residue of the forerunner crop and based on humus decomposition;
   loading the program into a controller operably coupled to an applicator; and
   controlling the applicator according to the program to apply material to the field of interest.

2. The method of claim 1 wherein determining a balance of humus includes:
   determining a balance of humus based on heat and moisture conditions during an immediately previous year, and the soil type.

3. The method of claim 1 wherein determining a program comprises:
   determining field requirements for nitrogen, phosphorus and potassium (NPK) in the field of interest.

4. The method of claim 3 wherein determining field requirements comprises:
   determining a plant uptake value of NPK in the field of interest; and
   subtracting from the plant uptake value, NPK levels added to the field of interest.

5. The method of claim 4 wherein subtracting comprises:
   determining NPK values added to the field of interest based on mineral fertilizers applied to the field.

6. The method of claim 5 wherein subtracting comprises:
   determining NPK values added to the field of interest based on NPK released from plant residues of the forerunner crop.

7. The method of claim 6 wherein subtracting comprises:
   determining NPK values added to the field of interest based on organic fertilizers applied to the field.

8. The method of claim 7 wherein subtracting comprises:
   determining NPK values added to the field of interest based on post-action additions of phosphorus and potassium provided to the field of interest during previous years.

9. The method of claim 8 wherein determining field requirements includes:
   correcting field requirements for nitrogen based on humus reserves in the field of interest.

10. The method of claim 8 wherein determining field requirements includes:
    correcting phosphorus and potassium based on a pH level of the soil in the field of interest.

11. The method of claim 10 and further comprising:
    monitoring yield and residue from the field of interest;
    collecting yield data indicative of the yield monitored; and
    modifying plant uptake values of NPK based on the yield data collected.

12. The method of claim 11 and further comprising:
    determining an irrigation level indicative of a desired amount of moisture to be applied to the field of interest through irrigation.

13. The method of claim 12 wherein the irrigation level is determined based on plant phenological phases.

14. The method of claim 13 wherein the irrigation level is determined based on current soil moisture and precipitation.

15. The method of claim 13 wherein the irrigation level is determined based on prior irrigation levels.

16. The method of claim 13 wherein the irrigation level is determined based on air temperature, humidity, and wind levels.

17. The method of claim 16 wherein the irrigation level is determined based on ground water and vertical flow characteristics in the field of interest.

18. The method of claim 17 wherein the irrigation level is determined based on evapotranspiration dynamics in the field of interest.

19. A method of treating a field of interest, comprising:
    taking a plurality of soil samples from different geographic locations in the field of interest;
    determining, for each of the plurality of samples, a geographic identifier identifying the geographic location from which the sample was taken;
    analyzing the samples to determine a plurality of soil characteristics indicative of soil condition;
    accessing data from a data base to obtain field characteristics corresponding to the field of interest, the field characteristics being indicative of current and historical information corresponding to the field of interest;

determining a program for applying material to the field of interest based on the soil characteristics, the geographic identifiers and the field characteristics, wherein determining a program comprises determining field requirements for nitrogen, phosphorous and potassium (NPK) in the field of interest by determining a plant uptake value of NPK in the field of interest and subtracting from the plant uptake value NPK levels added to the field of interest based on NPK released from plant residues of a forerunner crop;

loading the program into a controller operably coupled to an applicator; and controlling the applicator according to the program to apply material to the field of interest.

20. A method of treating a field of interest, comprising:

taking a plurality of soil samples from different geographic locations in the field of interest;

determining, for each of the plurality of samples, a geographic identifier identifying the geographic location from which the sample was taken;

analyzing the samples to determine a plurality of soil characteristics indicative of soil condition;

accessing data from a data base to obtain field characteristics corresponding to the field of interest, the field characteristics being indicative of current and historical information corresponding to the field of interest;

determining a program for applying material to the field of interest based on the soil characteristics, the geographic identifiers and the field characteristics;

loading the program into a controller operably coupled to an applicator;

controlling the applicator according to the program to apply material to the field of interest; and determining an irrigation level indicative of a desired amount of moisture to be applied to the field of interest through irrigation based on air temperature, humidity and wind levels.

* * * * *

UNITED STATES PATENT AND TRADEMARK OFFICE
CERTIFICATE OF CORRECTION

PATENT NO. : 5,668,719

DATED : September 16, 1997

INVENTOR(S) : Bobrov et al.

It is certified that error appears in the above-indentified patent and that said Letters Patent is hereby corrected as shown below:

```
Column 20, line 15, delete "red(50)" and insert
--md(50)--.

Column 20, line 15, delete "red(51)" and insert
--md(51).

Column 20, line 15, delete "red(52)" and insert
--md(52)--.

Column 22, line 22, delete "NiΣ(t(j)-5)>T(i, k)j
= N(i - 1)" and insert the following --Ni
        Σ(t(j)-5)>T(i, k)
        j = N(i - 1)--.
```

UNITED STATES PATENT AND TRADEMARK OFFICE
CERTIFICATE OF CORRECTION

PATENT NO. : 5,668,719
DATED : September 16, 1997
INVENTOR(S) : Bobrov et al.

It is certified that error appears in the above-indentified patent and that said Letters Patent is hereby corrected as shown below:

Column 23, line 28, delete "tiP(j) = 0, P0(j)<=5, P(j) = P0(j) - 5, P0(j) > 5" and insert the following:

--P(j) = 0, P0(j) <=5,
P(j) = P0(j) - 5, P0(j) > 5--.

Column 26, line 62, delete "f(T) = exp (-(T - r1)$^2$ / (2 * r2$^2$))g(W) = exp (-(W - p1)$^2$/(2 * p2$^2$))" and insert the following:

--f(T) = exp (-(T - r1)$^2$ / (2 * r2$^2$))
g(W) = exp (-(W - p1)$^2$/(2 * p2$^2$))--.

Signed and Sealed this

Twenty-eighth Day of July, 1998

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,668,719
DATED : September 16, 1997
INVENTOR(S) : Bobrov et al.

It is certified that error appears in the above-indentified patent and that said Letters Patent is hereby corrected as shown below:

On the title page:

Under [56] References Cited, U.S. PATENT DOCUMENTS, insert the following:

--RE 31,023  9/82  Hall, III     47/1R--.

Under [56] References Cited, OTHER PUBLICATIONS, insert the following:

--"Data in a hat", by Larry Reichenberger, Farm Journal, Vol 117, issue 11, Oct. 1993 p 17.--

Signed and Sealed this

Twelfth Day of January, 1999

Attest:

Attesting Officer      *Acting Commissioner of Patents and Trademarks*